(12) United States Patent
Akuzawa et al.

(10) Patent No.: US 11,634,204 B2
(45) Date of Patent: Apr. 25, 2023

(54) BOAT

(71) Applicant: YAMAHA HATSUDOKI KABUSHIKI KAISHA, Iwata (JP)

(72) Inventors: Shu Akuzawa, Shizuoka (JP); Hirotaka Aoki, Shizuoka (JP); Yusuke Ashida, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 169 days.

(21) Appl. No.: 16/465,618

(22) PCT Filed: Dec. 2, 2016

(86) PCT No.: PCT/JP2016/085986
§ 371 (c)(1),
(2) Date: May 31, 2019

(87) PCT Pub. No.: WO2018/100750
PCT Pub. Date: Jun. 7, 2018

(65) Prior Publication Data
US 2019/0300138 A1  Oct. 3, 2019

(51) Int. Cl.
*B63H 25/04* (2006.01)
*B63H 21/21* (2006.01)
(Continued)

(52) U.S. Cl.
CPC ............. *B63H 25/04* (2013.01); *B63H 21/21* (2013.01); *B63H 25/42* (2013.01); *G01C 21/22* (2013.01);
(Continued)

(58) Field of Classification Search
CPC ........ B63H 25/04; B63H 25/42; B63H 21/21; B63H 2021/216; B63H 25/46; G05D 1/02;
(Continued)

(56) References Cited

U.S. PATENT DOCUMENTS

| 10,481,602 B2* | 11/2019 | Chandy ................ B62D 15/025 |
| 2005/0229833 A1* | 10/2005 | McKenney ............. G05G 5/05 |
| | | 114/144 R |

(Continued)

FOREIGN PATENT DOCUMENTS

| JP | 2006-290196 A | 10/2006 |
| JP | 2007-106397 A | 4/2007 |

(Continued)

OTHER PUBLICATIONS

Official Communication issued in International Patent Application No. PCT/JP2016/085986, dated Feb. 28, 2017.

*Primary Examiner* — Rachid Bendidi
*Assistant Examiner* — Abdalla A Khaled
(74) *Attorney, Agent, or Firm* — Keating and Bennett, LLP

(57) ABSTRACT

A boat includes a boat body, a propulsion device, an operator that operates the propulsion device, and a controller. The propulsion device is disposed in the boat body and generates a propulsion force to move the boat body. The controller executes an automatic shore arrival control to control the propulsion device so as to cause the boat body to move toward a target position. The controller ends the automatic shore arrival control when the operator is positioned in a non-neutral position that differs from a neutral position.

8 Claims, 18 Drawing Sheets

(51) Int. Cl.
  *G05D 1/02* (2020.01)
  *B63H 25/42* (2006.01)
  *G01C 21/22* (2006.01)
  *G08G 3/00* (2006.01)
  *G05D 1/00* (2006.01)

(52) U.S. Cl.
  CPC ............... *G05D 1/00* (2013.01); *G05D 1/02* (2013.01); *G05D 1/0206* (2013.01); *G08G 3/00* (2013.01); *B63H 2021/216* (2013.01)

(58) Field of Classification Search
  CPC ...... G05D 1/00; G05D 1/0206; G05D 1/0094; G01C 21/22; G08G 3/00
  See application file for complete search history.

(56) References Cited

U.S. PATENT DOCUMENTS

| | | | | |
|---|---|---|---|---|
| 2006/0278152 A1* | 12/2006 | Nickerson | ............ | B63H 25/22 114/144 R |
| 2007/0073454 A1* | 3/2007 | Kaji | ................ | G05D 1/0206 701/21 |
| 2007/0089654 A1* | 4/2007 | Bradley | ............. | B63H 21/22 114/10 |
| 2007/0089660 A1* | 4/2007 | Bradley | ............. | B63H 21/22 114/144 A |
| 2007/0178779 A1 | 8/2007 | Takada et al. | | |
| 2011/0213515 A1* | 9/2011 | Haymart | ............. | G06F 16/29 707/769 |
| 2012/0277941 A1* | 11/2012 | Noffsinger | ........... | G08G 3/00 701/21 |
| 2014/0336927 A1* | 11/2014 | Ellis | ................ | G01C 21/203 701/467 |
| 2015/0089427 A1* | 3/2015 | Akuzawa | ............ | G05D 1/0206 715/771 |
| 2015/0366134 A1* | 12/2015 | Dollinger | ............ | A01D 90/10 701/50 |
| 2016/0207536 A1* | 7/2016 | Yamaoka | ............ | B60W 30/09 |
| 2017/0144740 A1* | 5/2017 | Ito | ..................... | B63H 25/02 |
| 2017/0205829 A1* | 7/2017 | Tyers | ................. | B63H 25/04 |
| 2018/0015994 A1* | 1/2018 | Kishimoto | ........... | B63H 25/46 |
| 2018/0043905 A1* | 2/2018 | Kim | ................... | B60W 50/10 |
| 2018/0046190 A1* | 2/2018 | Hitachi | ............... | B63B 49/00 |
| 2018/0050772 A1* | 2/2018 | Koyano | .............. | B63H 21/21 |

FOREIGN PATENT DOCUMENTS

| | | |
|---|---|---|
| JP | 2011-128943 A | 6/2011 |
| JP | 2015-066979 A | 4/2015 |
| WO | 2016/163559 A1 | 10/2016 |

* cited by examiner

| STARTING CONDITIONS FOR AUTOMATIC SHORE ARRIVAL MODE (AND CONDITIONS) ||
|---|---|
| ITEM | REQUESTED STATE |
| FIRST THROTTLE OPERATING MEMBER 15L | NEUTRAL POSITION |
| SECOND THROTTLE OPERATING MEMBER 15R | NEUTRAL POSITION |
| FIRST ENGINE 3L | RUNNING |
| SECOND ENGINE 3R | RUNNING |
| ROTATION SPEED OF FIRST ENGINE 3L | EQUAL TO OR LESS THAN PREDETERMINED THRESHOLD |
| ROTATION SPEED OF SECOND ENGINE 3R | EQUAL TO OR LESS THAN PREDETERMINED THRESHOLD |
| SPEED, ACCELERATION, ANGULAR SPEED, AND ANGULAR ACCELERATION OF BOAT BODY 2 | EQUAL TO OR LESS THAN PREDETERMINED THRESHOLD |
| SYSTEM ERROR | NO ERROR GENERATED |
| DETECTION OF OBSTRUCTION BY SENSING DEVICE 46 | NO |

FIG. 17

| TRANSITION CONDITIONS FOR TRANSITIONING TO MANUAL OPERATION MODE (OR CONDITIONS) ||
|---|---|
| ITEM | REQUESTED STATE |
| MANUAL OPERATION MODE TRANSITION BUTTON 70 | ON |
| FIRST THROTTLE OPERATING MEMBER 15L | NON-NEUTRAL POSITION |
| SECOND THROTTLE OPERATING MEMBER 15R | NON-NEUTRAL POSITION |
| AUTOMATIC SHORE ARRIVAL MODE STOP BUTTON 68 | ON |
| SYSTEM ERROR | NO ERROR GENERATED |
| DETECTION OF OBSTRUCTION BY SENSING DEVICE 46 | YES |
| POSITION OF BOAT 1 | OUTSIDE OF PREDETERMINED AREA |

FIG. 18

BOAT

BACKGROUND OF THE INVENTION

1. Field of the Invention

The present invention relates to a boat.

2. Description of the Related Art

The smooth shore arrival of a boat requires high skill and is not easy for anyone except an experienced person. Accordingly, a device for assisting the arrival of a boat at the shore is conventionally known. For example, Japanese Patent Laid-open No. 2011-128943 discloses a shore arrival assistance device for a boat entering a specific harbor.

The shore arrival assistance device includes a recording device that records the locus from the entrance into the harbor until a shore arrival target position, and boat operating instructions are issued to the boat operator so as to follow the locus when arriving at the shore. Specifically, during shore arrival, an approach range is determined from the locus, and when the position of the boat deviates from the approach range, an instruction is outputted by the shore arrival assistance device to the boat operator so as to return to the final approach starting point.

However, the shore arrival assistance device can only be used in a specific harbor for which a locus is recorded in the recording device. In addition, even if the boat is moved without deviating from the approach range, the boat operation in the vicinity of the shore is not easy and the boat operator requires high skill to be able to bring the boat to the shore smoothly.

Alternatively, when loading the boat onto a trailer, there is a need to move the boat precisely up to the loading position. The above type of operation is also not easy and high boat operating skill is required by the boat operator.

SUMMARY OF THE INVENTION

Preferred embodiments of the present invention provide boats that are each able to arrive at the shore easily at any harbor. Other preferred embodiments of the present invention provide boats with each of which work to load the boat onto a trailer is easily performed.

A boat according to a preferred embodiment of the present invention includes a boat body, a propulsion device, an operator to operate the propulsion device, and a controller. The propulsion device is disposed in the boat body and generates a propulsion force to move the boat body. The controller executes an automatic shore arrival control to control the propulsion device so as to move the boat body toward a target position. The controller ends the automatic shore arrival control when the operator is positioned in a non-neutral position that differs from a neutral position.

According to a preferred embodiment of the present invention, the automatic shore arrival control is able to be executed to automatically move the boat body toward a shore arrival location based on the environment information which indicates the shape of a shore arrival location and a positional relationship between the shore arrival location and the boat body. As a result, the boat is able to arrive at the shore easily even in an unspecified harbor. Alternatively, the work to load the boat onto a trailer is facilitated.

Furthermore, according to a preferred embodiment of the present invention, because the automatic shore arrival control is ended when the operator is positioned in a non-neutral position, the execution of the automatic shore arrival control is able to be put on standby when a boat operator intentionally moves the boat body. In addition, the automatic shore arrival control is promptly ended when the boat operator intentionally moves the boat body during the execution of the automatic shore arrival control. As a result, the intention of the boat operator is reflected in the automatic shore arrival control.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 17 is a view illustrating the contents of starting conditions for an automatic shore arrival mode.

FIG. 18 is a view illustrating the contents of transition conditions for transitioning to a manual operation mode.

DETAILED DESCRIPTION OF THE PREFERRED EMBODIMENTS

Figure 1:
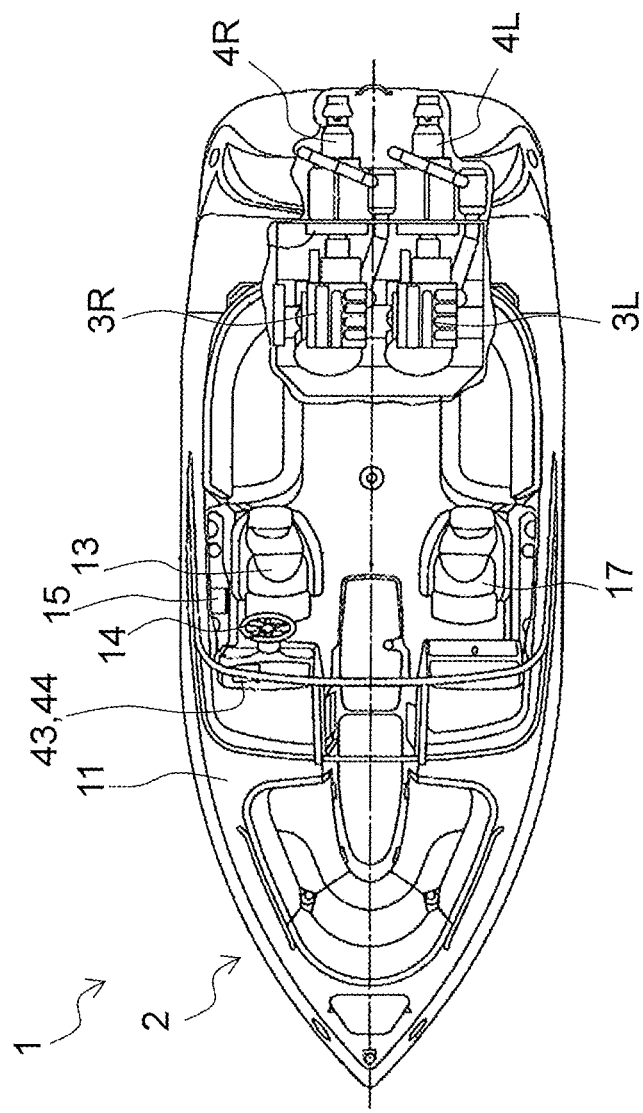
FIG. 1 is a plan view of a boat according to a preferred embodiment of the present invention.
Figure 2:
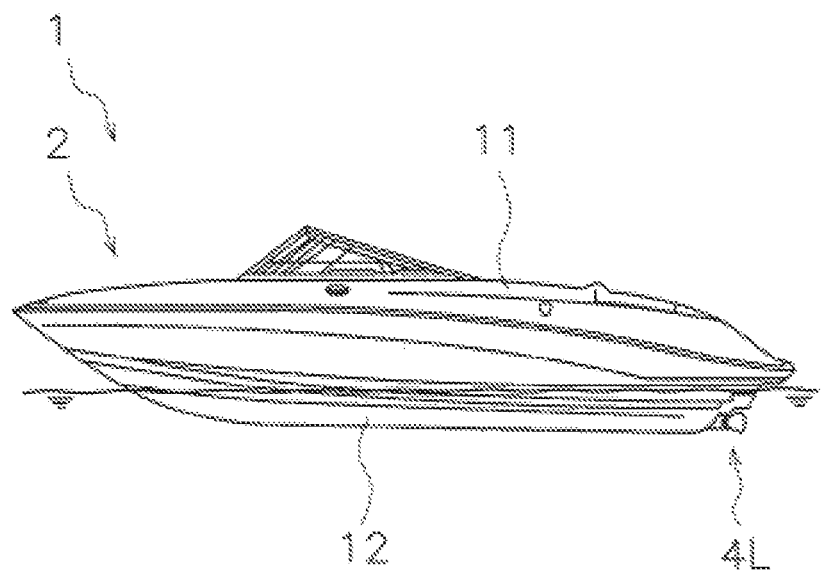
FIG. 2 is a side view of the boat.

The following is an explanation of boats according to preferred embodiments of the present invention with reference to the drawings. FIG. 1 is a plan view of a boat 1. In FIG. 1, a portion of the configuration inside the boat 1 is depicted. FIG. 2 is a side view of the boat 1. In the present preferred embodiment, the boat 1 is a jet propulsion boat, for example, and is a type of boat called a jet boat or a sports boat.

The boat 1 includes a boat body 2, engines 3L and 3R, and propulsion devices 4L and 4R. The boat body 2 includes a deck 11 and a hull 12. The hull 12 is disposed below the deck 11. A boat operator's seat 13 and a passenger seat 17 are disposed on the deck 11.

The boat 1 includes two engines 3L and 3R and two propulsion devices 4L and 4R, for example. Specifically, the boat 1 includes a first engine 3L and a second engine 3R. The boat 1 includes a first propulsion device 4L and a second propulsion device 4R. However, the number of engines is not limited to two and there may be one engine or three or more engines. The number of propulsion devices is not limited to two and there may be one propulsion device or three or more propulsion devices.

The first engine 3L and the second engine 3R are contained in the boat body 2. The output shaft of the first engine 3L is connected to the first propulsion device 4L. The output shaft of the second engine 3R is connected to the second propulsion device 4R. The first propulsion device 4L is driven by the first engine 3L to produce a propulsion force to move the boat body 2. The second propulsion device 4R is driven by the second engine 3R to produce a propulsion force to move the boat body 2. The first propulsion device 4L and the second propulsion device 4R are disposed side by side to the right and left of each other.

Figure 3:
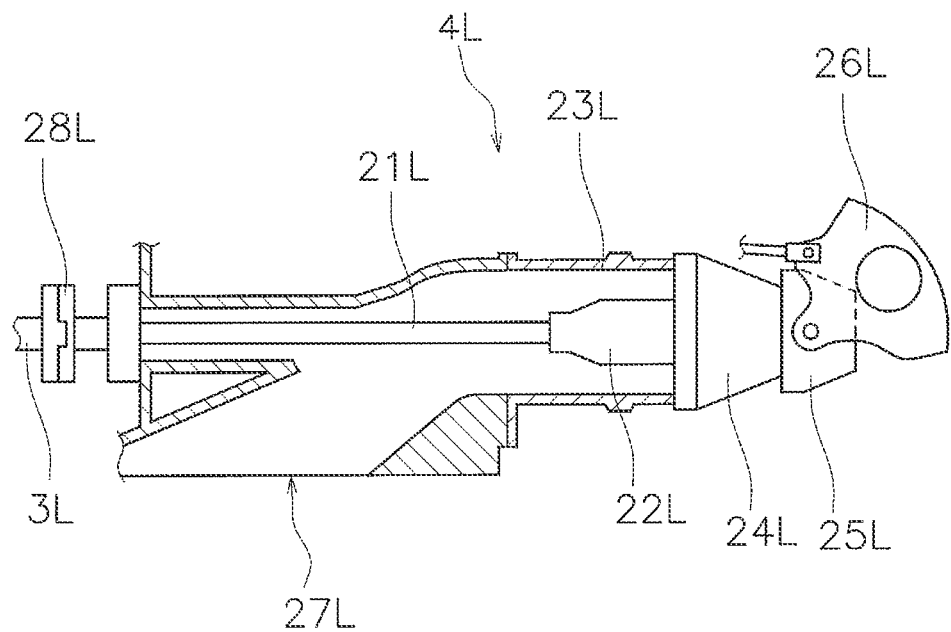
FIG. 3 is a side cross-sectional view illustrating a configuration of a first propulsion device of the boat.

The first propulsion device 4L is a propulsion device that sucks in and jets water around the boat body 2. FIG. 3 is a side view illustrating a configuration of the first propulsion device 4L. A portion of the first propulsion device 4L is illustrated as a cross-section in FIG. 3.

As illustrated in FIG. 3, the first propulsion device 4L includes a first impeller shaft 21L, a first impeller 22L, a first impeller housing 23L, a first nozzle 24L, a first deflector 25L, and a first reverse bucket 26L. The first impeller shaft 21L extends in the front-back direction. The front portion of the first impeller shaft 21L is connected to the output shaft of the engine 3L via a coupling 28L. The rear portion of the first impeller shaft 21L is disposed inside the first impeller housing 23L. The first impeller housing 23L is disposed behind a water suction portion 27L. The first nozzle 24L is disposed behind the first impeller housing 23L.

The first impeller 22L is attached to the rear portion of the first impeller shaft 21L. The first impeller 22L is disposed inside the first impeller housing 23L. The first impeller 22L rotates with the first impeller shaft 21L and sucks in water from the water suction portion 27L. The first impeller 22L jets the sucked in water from the first nozzle 24L to the rear.

The first deflector 25L is disposed behind the first nozzle 24L. The first reverse bucket 26L is disposed behind the first deflector 25L. The first deflector 25L switches the jetting direction of the water from the first nozzle 24L to the left and right directions. That is, by changing the bearing of the first deflector 25L in the left and right directions, the traveling direction of the boat 1 is changed to the left or right.

The first reverse bucket 26L is able to switch between a neutral position, a forward travel position, and a reverse travel position. While the first reverse bucket 26L is in the neutral position, water from the first nozzle 24L and the first deflector 25L is jetted while being distributed toward the front and the rear. As a result, the boat 1 is stationary. While the first reverse bucket 26L is in the forward travel position, water from the first nozzle 24L and the first deflector 25L is jetted toward the rear. As a result, the boat 1 travels forward. While the first reverse bucket 26L is in the reverse travel position, the jetting direction of the water from the first nozzle 24L and the first deflector 25L is changed to the front. As a result, the boat 1 travels in reverse.

Although omitted in the drawings, the second propulsion device 4R includes a second impeller shaft, a second impeller, a second impeller housing, a second nozzle, a second deflector, and a second reverse bucket. The second impeller shaft, the second impeller, the second impeller housing, the second nozzle, the second deflector, and the second reverse bucket are respectively configured in the same way as the first impeller shaft 21L, the first impeller 22L, the first impeller housing 23L, the first nozzle 24L, the first deflector 25L, and the first reverse bucket 26L, and explanations thereof are omitted.

Figure 4:
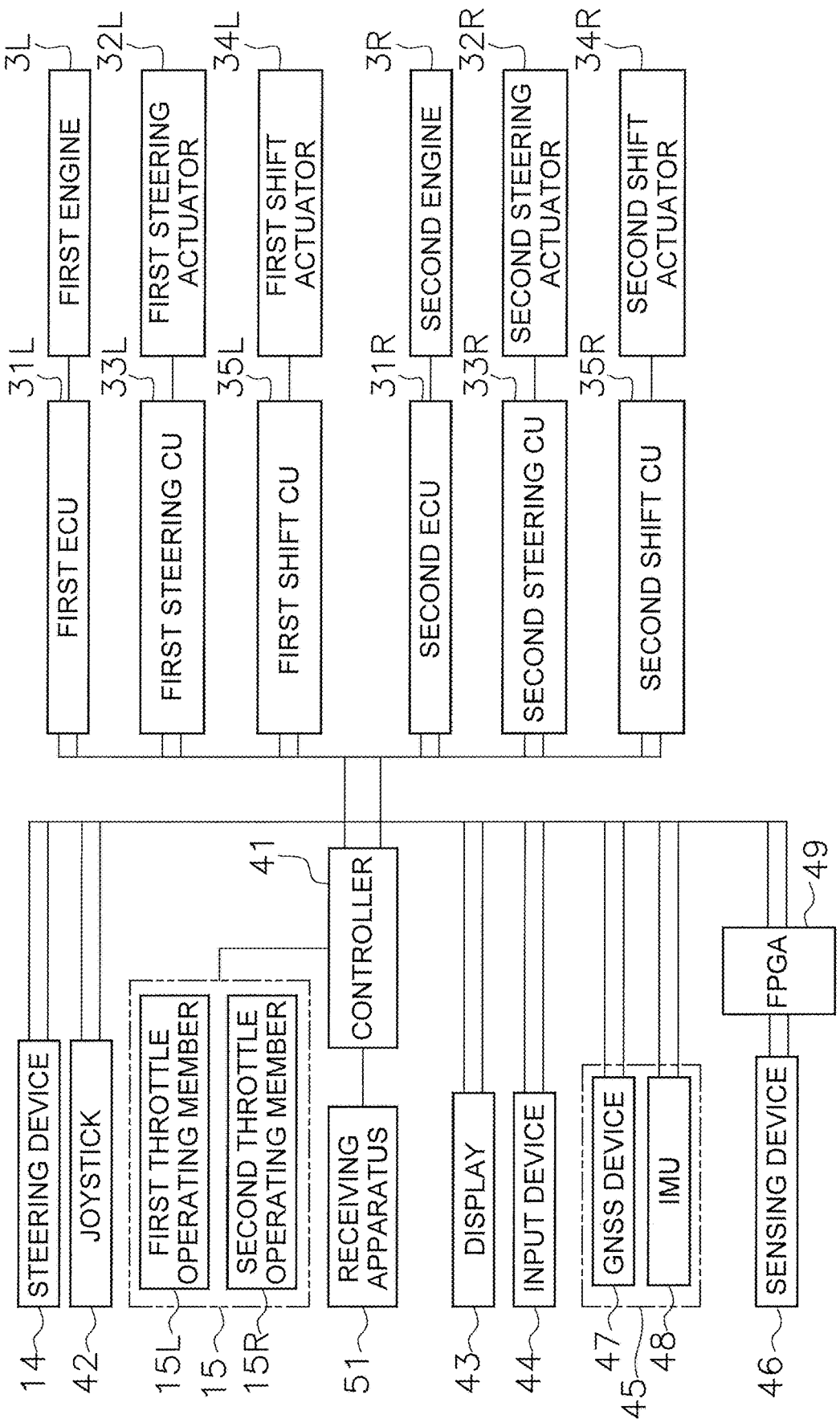
FIG. 4 is a schematic view illustrating a boat operating mechanism and a control system of the boat.

Next, the boat operating mechanism and the control system of the boat 1 will be explained. FIG. 4 is a schematic view illustrating the boat operating mechanism and the control system of the boat 1. As illustrated in FIG. 4, the boat 1 includes a controller 41. The controller 41 includes a computation device such as a CPU and a storage device such as a RAM or a ROM, and is programmed so as to control the boat 1.

The boat 1 includes a first engine control unit (ECU) 31L, a first steering actuator 32L, a first steering control unit (CU) 33, a first shift actuator 34L, and a first shift control unit (CU) 35L. The above elements control the first propulsion device 4L. Each of the first ECU 31L, the first steering CU 33L, and the first shift CU 35L include a computation device such as a CPU and a storage device such as a RAM or a ROM, and are configured or programmed so as to control the device to which they are connected.

The first ECU 31L is communicatively connected to the first engine 3L. The first ECU 31L outputs an instruction signal to the first engine 3L.

The first steering actuator 32L is connected to the first deflector 25L of the first propulsion device 4L. The first steering actuator 32L changes the steering angle of the first deflector 25L. The first steering actuator 32L is, for example, an electric motor. The first steering CU 33L is communicatively connected to the first steering actuator 32L. The first steering CU 33L outputs an instruction signal to the first steering actuator 32L.

The first shift actuator 34L is connected to the first reverse bucket 26L of the first propulsion device 4L. The first shift actuator 34L switches the position of the first reverse bucket 26L between the forward travel position and the reverse travel position. The first shift actuator 34L is, for example, an electric motor. The first shift CU 35L is communicatively connected to the first shift actuator 34L. The first shift CU 35L outputs an instruction signal to the first shift actuator 34L.

The boat 1 includes a second ECU 31R, a second steering actuator 32R, a second steering CU 33R, a second shift actuator 34R, and a second shift CU 35R. The above elements control the second propulsion device 4R and are configured in the same way as the above-described first ECU 31L, the first steering actuator 32L, the first steering CU 33L, the first shift actuator 34L, and the first shift CU 35L, respectively.

The boat 1 includes a steering device 14, a joystick 42, a remote control unit 15, a display 43, an input 44, a positional sensor 45, and a sensing device 46. The steering device 14, the display 43, the input 44, the positional sensor 45, and the sensing device 46 are communicatively connected to the controller 41, the first and second ECUs 31L and 31R, the first and second steering CUs 33L and 33R, and the first and second shift CUs 35L and 35R. For example, the above devices are connected to each other over a control area network (CAN) or a CAN with a flexible data rate (CAN-FD).

Due to the above devices being connected to each other, the transmission of information between each of the devices is possible at the same time. Consequently, adjustment control of the steering, shifting, and throttling are performed easily. In addition, the connections of the above devices define a duplex system. As a result, stable communication is maintained.

The remote control unit 15 has an analog connection with the controller 41. However, the remote control unit 15 may be connected over the CAN network or the like in the same way as the other devices.

The steering device 14 is disposed at the boat operator's seat 13. The steering device 14 includes, for example, a steering wheel. The steering device 14 is operated to steer the boat body 2. The steering device 14 is able to be operated between a right turn position and a left turn position relative to the neutral position.

The steering device 14 outputs a steering operation signal which indicates an operation amount and an operating direction (right turn position or left turn position) relative to the neutral position. The first steering CU 33L and the second steering CU 33R control the first and second steering actuators 32L and 32R in accordance with the steering operation signal. When the steering device 14 is in the neutral position, the boat 1 travels straight. When the steering device 14 is in the right turn position, the boat 1 turns to the right. When the steering device 14 is in the left turn position, the boat 1 turns to the left.

The remote control unit 15 is disposed at the boat operator's seat 13. The remote control unit 15 is operated to adjust the output of the engines 3L and 3R, and to switch between forward and reverse travel. The remote control unit 15 includes a first throttle operator 15L and a second throttle operator 15R. The first throttle operator 15L and the second throttle operator 15R each are examples of an "operator" to operate the shifting and throttling of the propulsion devices.

The first and second throttle operators 15L and 15R are, for example, lever-shaped members. The first and second throttle operators 15L and 15R are able to be operated in the forward movement position and the reverse movement position relative to the neutral position. In the present preferred embodiment, the forward movement position and the reverse movement position are both examples of a "non-neutral position."

The remote control unit 15 outputs, to the controller 41, throttle operation signals which indicate the operation amounts and operating directions (neutral position, forward movement position, or reverse movement position) of the first and second throttle operators 15L and 15R.

The first ECU 31L controls the rotation speed of the first engine 3L in response to the operation amount of the first throttle operator 15L relative to the neutral position. The second ECU 31R controls the rotation speed of the second engine 3R in response to the operation amount of the second throttle operator 15R relative to the neutral position.

The first shift CU 35L controls the first shift actuator 34L in response to the operating direction of the first throttle operator 15L. When the first throttle operator 15L is positioned in the neutral position, the first shift actuator 34L causes the first reverse bucket 26L to be positioned in the neutral position. In this case, the first propulsion device 4L does not generate a propulsion force. When the first throttle operator 15L is positioned in the forward movement position, the first shift actuator 34L causes the first reverse bucket 26L to be positioned in the forward movement position. In this case, the first propulsion device 4L generates a propulsion force to cause the boat body 2 to move forward. When the first throttle operator 15L is positioned in the reverse movement position, the first shift actuator 34L causes the first reverse bucket 26L to be positioned in the reverse movement position. In this case, the first propulsion device 4L generates a propulsion force to cause the boat body 2 to move in reverse.

The second shift CU 35R controls the second shift actuator 34R in response to the operating direction of the second throttle operator 15R. When the second throttle operator 15R is positioned in the neutral position, the second shift actuator 34R causes the second reverse bucket 26R to be positioned in the neutral position. In this case, the second propulsion device 4R does not generate a propulsion force. When the second throttle operator 15R is positioned in the forward movement position, the second shift actuator 34R causes the second reverse bucket 26R to be positioned in the forward movement position. In this case, the second propulsion device 4R generates a propulsion force to cause the boat body 2 to move forward. When the second throttle operator 15R is positioned in the reverse movement position, the second shift actuator 34R causes the second reverse bucket 26R to be positioned in the reverse movement position. In this case, the second propulsion device 4R generates a propulsion force to cause the boat body 2 to move in reverse.

The joystick 42 is disposed at the boat operator's seat 13. The joystick 42 is operated to cause the boat body 2 to move forward and reverse and left and right. In addition, the joystick 42 is operated to change the bearing of the boat body 2. The operation signals from the joystick 42 are inputted to the controller 41. The controller 41 controls the first and second engines 3L and 3R, the first and second steering actuators 32L and 32R, and the first and second shift actuators 34L and 34R. As a result, the boat 1 moves forward and reverse and to the left and right. Alternatively, the boat 1 is turned to change the bearing.

The display 43 and the input 44 are disposed at the boat operator's seat 13. The display 43 displays information pertaining to the boat 1. The display 43 receives display information from the controller 41. The display 43 displays information in response to the display signals from the controller 41.

The input 44 accepts inputs pertaining to the boat 1. The input 44 outputs input signals indicating the inputted information. The input 44 may be integral with the display 43 and include a touch panel. Alternatively, the input 44 may be separate from the display 43.

The positional sensor 45 detects the current position and the current bearing of the boat body 2 and outputs position information indicating the current position and the current bearing. The positional sensor 45 is, for example, an inertial navigation device and includes a global navigation satellite system (GNSS) device 47 and an inertial measurement unit (IMU) 48. The GNSS device 47 detects the current position and the boat speed of the boat body 2. The IMU 48 detects the angular speed and the acceleration of the boat body 2. In addition, the current bearing of the boat body 2 is detected by the GNSS device 47 and the IMU 48. The current bearing may be detected by a plurality of GNSS devices, a magnetic bearing sensor, or an electronic compass.

The sensing device 46 detects the shapes of objects surrounding the boat body 2 and the positional relationship between the objects and the boat body 2. The positional relationship between the objects and the boat body 2 includes the distance between the objects and the boat body 2 and the direction in which the object is positioned with respect to the boat body 2. Objects surrounding the boat body 2 include, for example, piers, wharves, other boats, obstructions, or the like.

The sensing device 46 includes one type of sensor or a plurality of types of sensors among a radar, a laser, a camera or an ultrasonic sensor. The sensing device 46 may include a plurality of radars, a plurality of lasers, a plurality of cameras, or a plurality of ultrasonic sensors. The radar includes, for example, a millimeter wave radar, a microwave radar, or another radar of a different wavelength. The sensing device 46 detects and outputs environment information during a below-described automatic shore arrival control.

The environment information indicates the shape of the shore arrival location and the positional relationship between the shore arrival location and the boat body 2. The environment information may indicate the shore arrival location or other boats surrounding the boat body 2. The environment information may indicate the shore arrival location or structures or obstructions surrounding the boat body 2. The environment information is indicated, for example, by coordinates of point groups indicating the position of an object detected by the sensing device 46. Alternatively, the environment information may be the shape and position of an object captured by image recognition.

As illustrated in FIG. 4, the sensing device 46 may be connected to the CAN or the CAN-FD through a programmable logic device (PLD) such as a field-programmable gate array (FPGA) 49 or the like. Alternatively, the sensing device 46 may be connected to the CAN or the CAN-FD through a digital signal processor (DSP).

Figure 20:
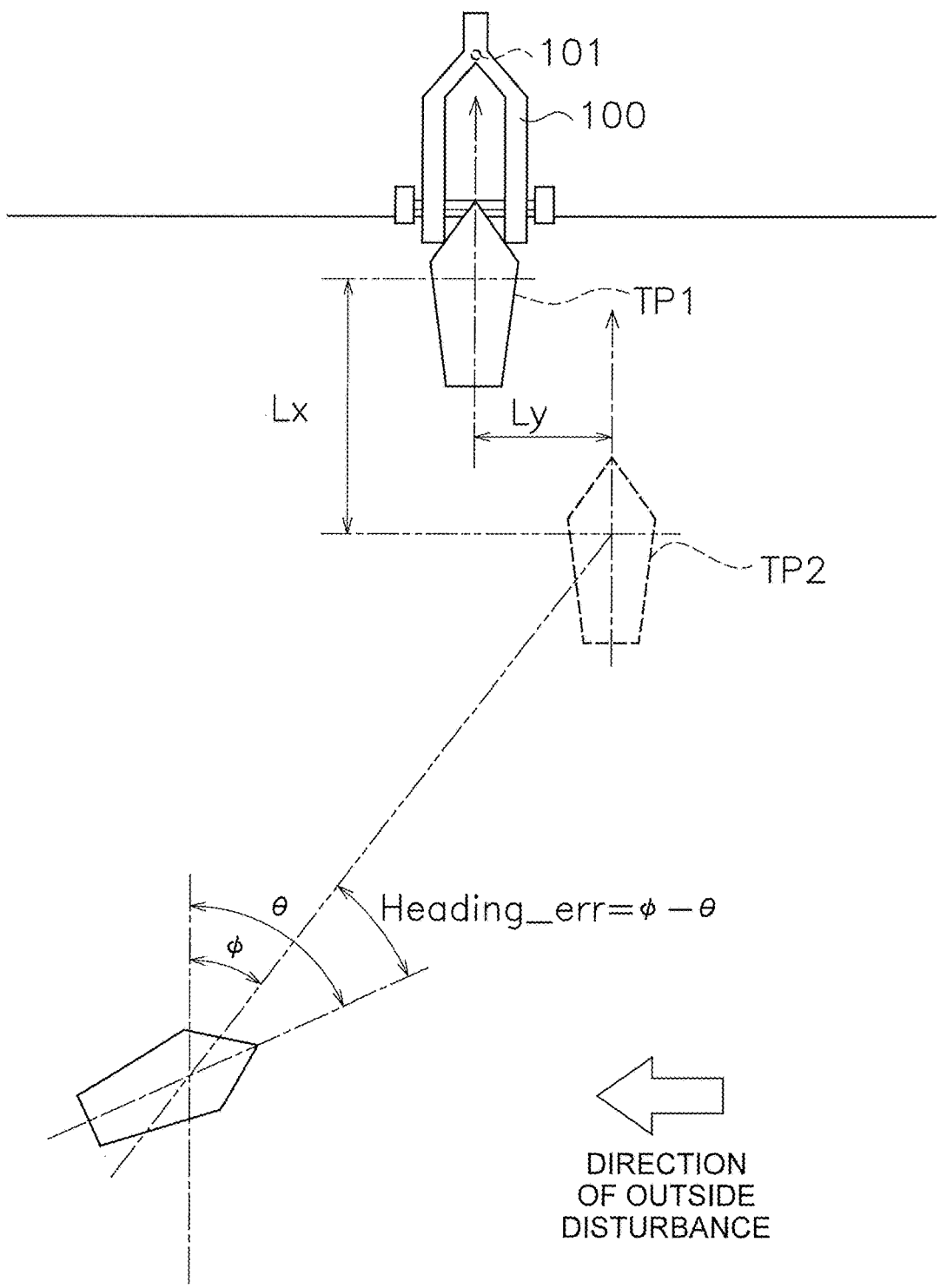
FIG. 20 is a view for explaining a trailer mode which is one type of automatic shore arrival control.

The boat 1 includes a receiver 51 for a trailer. The receiver 51 is connected in a communicable manner to the controller 41. As illustrated in FIG. 20, the receiver 51 receives trailer position information emitted by a transmitter 101 mounted on a trailer 100. The trailer position information indicates the current position of the trailer 100. Alternatively, the trailer position information may be obtained with a sensor that detects the current position of the trailer 100.

The boat 1 includes an automatic shore arrival function. The automatic shore arrival function automatically enables the boat body 2 to arrive at a shore arrival location such as a pier without operations by the boat operator. Hereinbelow, the automatic shore arrival control executed by the automatic shore arrival function will be explained in detail. FIGS. 5 to 8 are flow charts of a process of the automatic shore arrival control executed by the controller 41.

Figure 5:
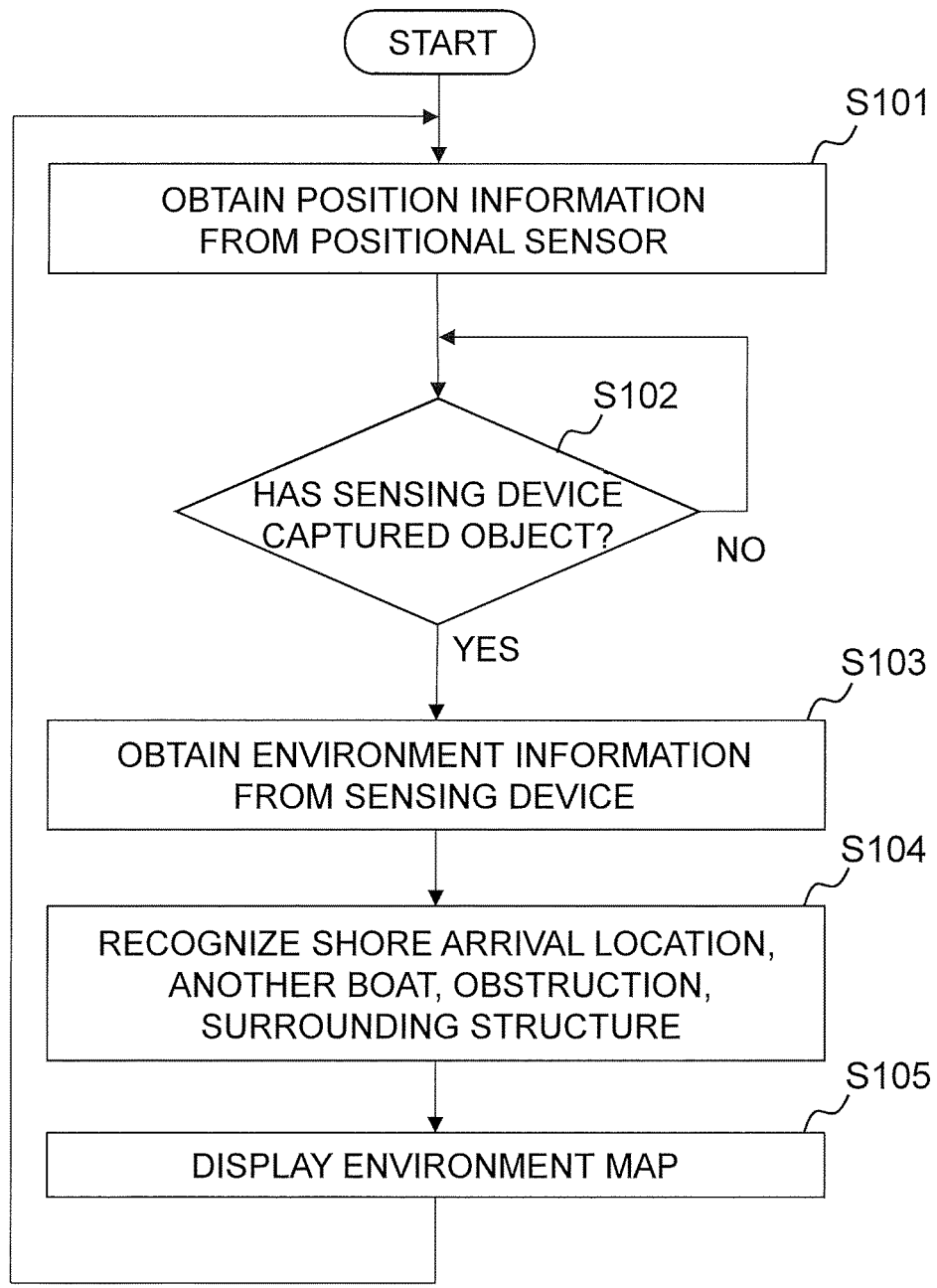
FIG. 5 is a flow chart illustrating automatic shore arrival control processing.

As illustrated in FIG. 5, the controller 41 obtains current position information from the positional sensor 45 in step S101. The controller 41 obtains the current position and the current bearing of the boat body 2 in real time from the position information. In step S102, the controller 41 evaluates whether the sensing device 46 has captured a sensing object. When an object is captured by the sensing device 46, the processing advances to step S103. In step S103, the controller 41 obtains the environment information from the sensing device 46.

In step S104, the controller 41 or the FPGA 49 recognizes a shore arrival location, another boat, an obstruction, or a surrounding structure based on the environment information. The shore arrival location is, for example, a pier. The controller 41 or the FPGA 49 recognizes another boat or an obstruction based on the shape of the object detected by the sensing device 46. For example, the controller 41 or the FPGA 49 recognizes the shore arrival location and the surrounding structure based on the height and length of the object detected by the sensing device 46.

Figure 9:
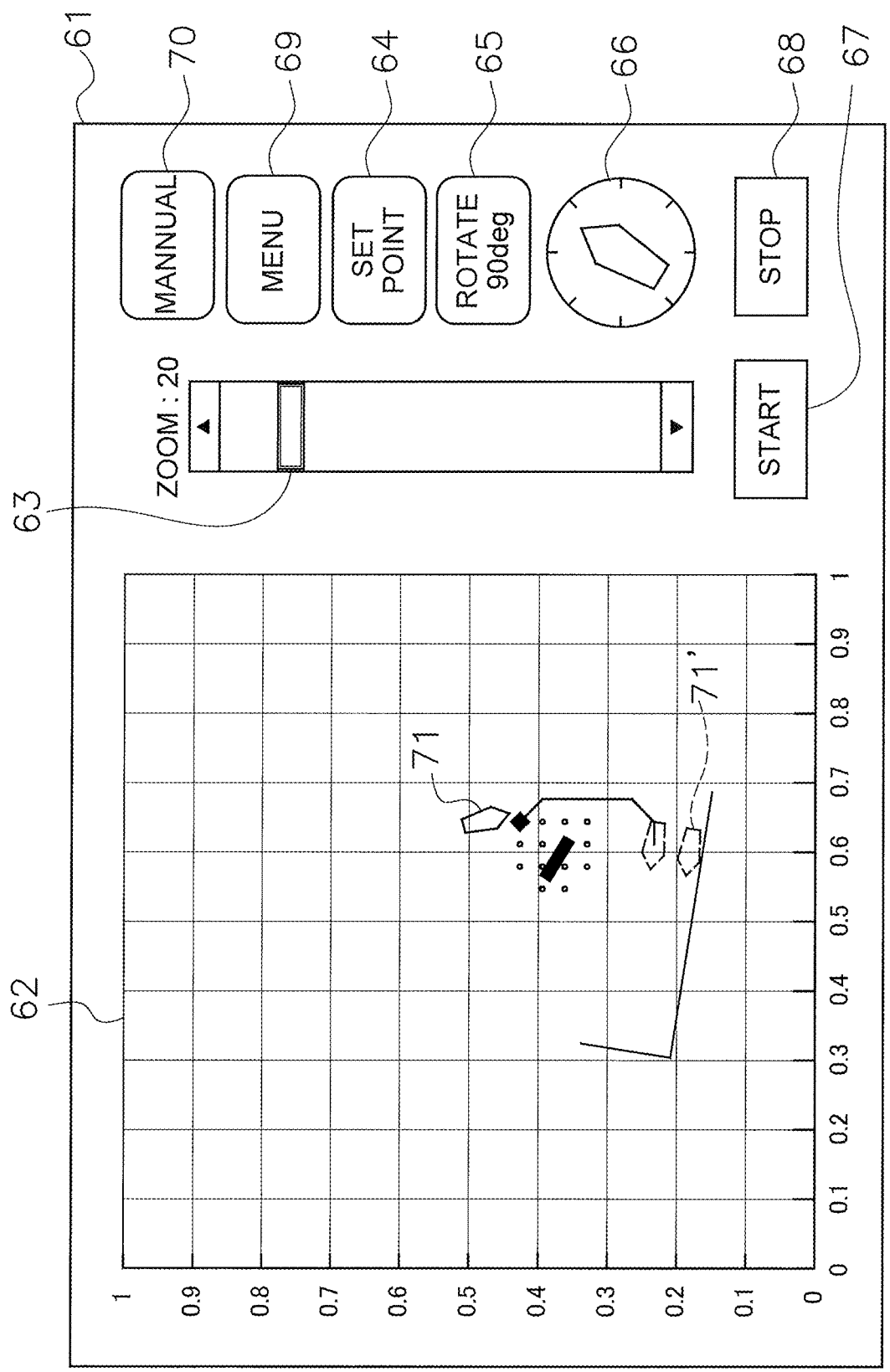
FIG. 9 is a view illustrating an operation screen.

In step S105, the controller 41 displays an environment map indicating the surrounding environment on the display 43. FIG. 9 is a view illustrating an operation screen 61 of the automatic shore arrival function. As illustrated in FIG. 9, the operation screen 61 is displayed by GUI on the display 43. The operation screen 61 includes an environment map 62 and a plurality of operating keys. By pressing the plurality of operating keys, the inputs of the various operations of the automatic shore arrival function are accepted by the input 44.

The shapes of the shore arrival location, the obstructions, and the surrounding structures recognized by the controller 41 are displayed on the environment map 62. While not illustrated in FIG. 9, other boats recognized by the controller 41 are also displayed on the environment map 62. The controller 41 displays the current position and the current bearing of the boat body 2 obtained from the position information on the environment map 62 with an icon 71 of the boat body 2.

The environment map 62 is updated in real time due to the repeated detection of the position information by the positional sensor 45 and the repeated detection of the environment information by the sensing device 46. The plurality of operating keys include a scale changing key 63. By operating the scale changing key 63, the displayed scale of the environment map 62 is enlarged or reduced.

Figure 6:
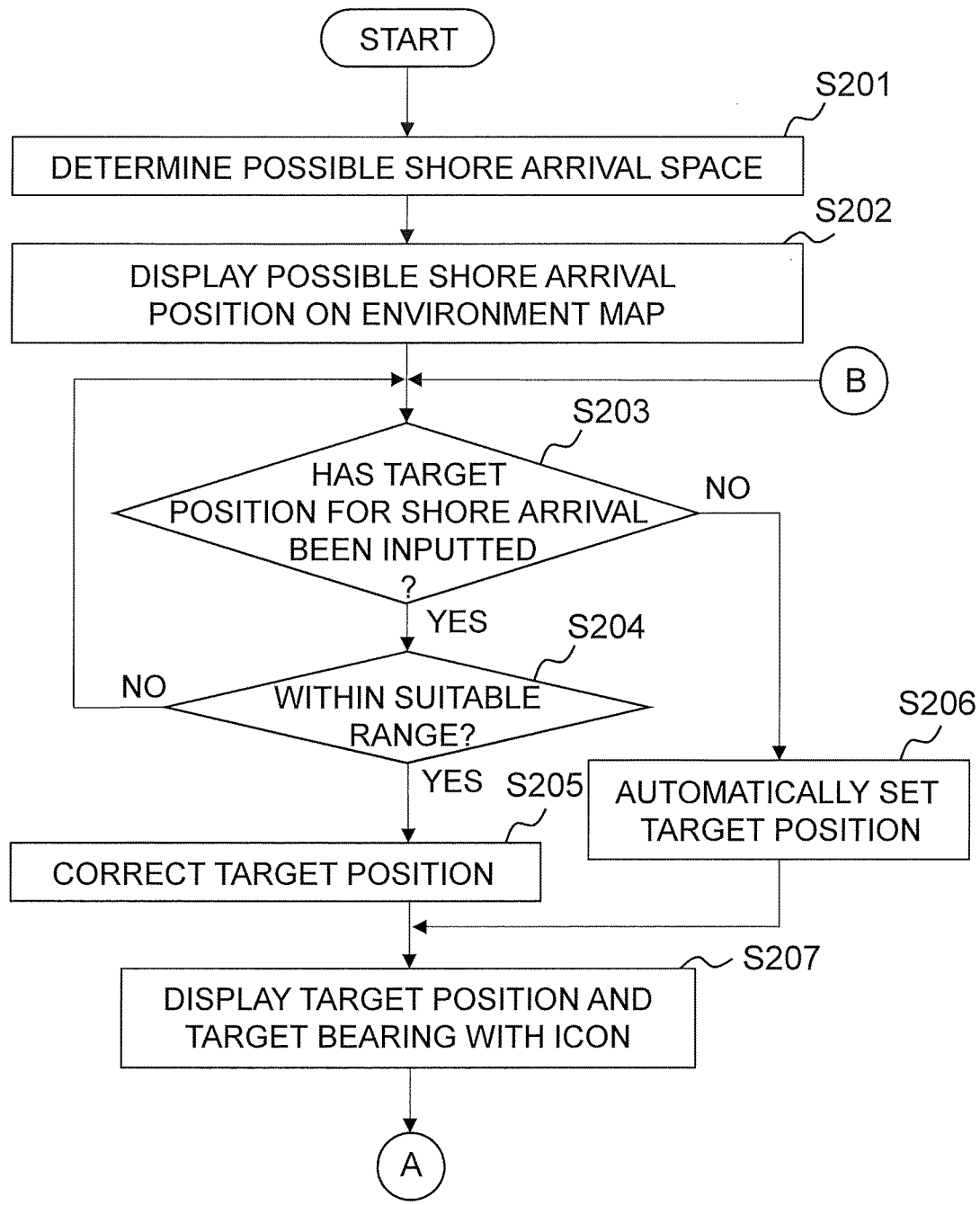
FIG. 6 is a flow chart illustrating automatic shore arrival control processing.
Figure 10:
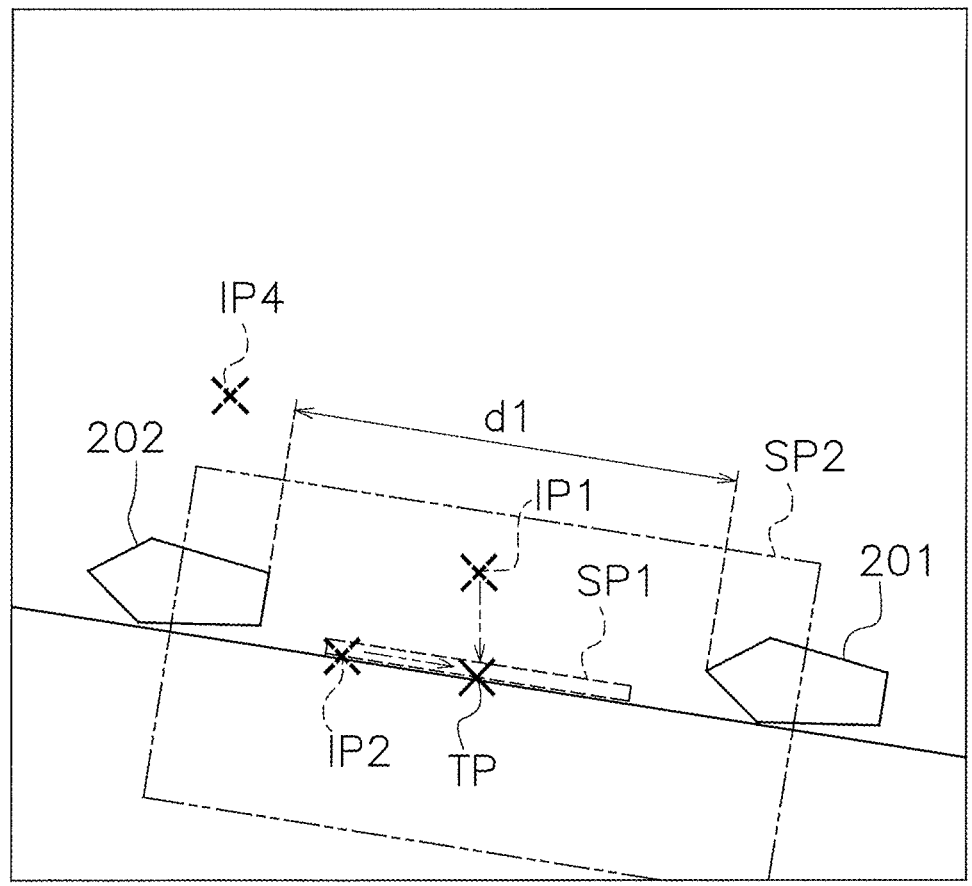
FIG. 10 is a view illustrating an input and correction method of a target position for shore arrival.

FIG. 6 is a flow chart illustrating processing to set a target position of the shore arrival. As illustrated in step S201 in FIG. 6, the controller 41 determines a possible shore arrival space. The controller 41 determines the possible shore arrival space based on the environment information. As illustrated in FIG. 10, the controller 41 determines a position along the object recognized as the shore arrival location, as a possible shore arrival space SP1. For example, the controller 41 detects the disposition of the pier from the environment information and determines a predetermined range along the pier as the possible shore arrival space SP1.

Moreover, the controller 41 detects the dispositions of the shore arrival location and of another boat docked at the shore arrival location from the environment information, and determines the possible shore arrival space SP1 from the dispositions of the shore arrival location and the other boat. As illustrated in FIG. 10, when two other boats 201 and 202 are docked with an interval therebetween, the controller 41 calculates a distance dl between the two other boats 201 and 202. The controller 41 then determines that the space between the two other boats 201 and 202 is able to serve as the possible shore arrival space SP1 when the distance dl between the two other boats 201 and 202 is greater than a threshold which indicates a space in which docking by the host boat is possible.

In step S202, the controller 41 displays the possible shore arrival location on the environment map 62. The possible shore arrival location may be the above-described possible shore arrival space SP1. Alternatively, the possible shore arrival location may be a specified position inside the possible shore arrival space SP1. The environment map 62 on which the possible shore arrival location is displayed may be a bird's-eye view as illustrated in FIG. 9. Alternatively, an image captured by a camera may be displayed as the environment map 62. In this case, the possible shore arrival location may be displayed on the image captured by the camera.

In step S203, the controller 41 evaluates whether there is an input of the target position for the shore arrival. Here, the input of the target position on the environment map 62 is accepted by the input 44. The boat operator touches the possible shore arrival location on the environment map 62, such that the touched position is inputted as the target position. The input 44 outputs target position information which indicates the target position to the controller 41.

In step S204, the controller 41 evaluates whether the inputted target position is within a suitable range SP2. When the inputted target position is within the suitable range SP2, the processing advances to step S205.

In step S205, the controller 41 corrects the target position. The controller 41 corrects the target position based on the possible shore arrival space SP1. For example, as illustrated in FIG. 10, when an inputted target position IP1 is outside of the possible shore arrival space SP1, the controller 41 corrects a target position Tp so that the target position is within the possible shore arrival space SP1. When an inputted target position IP2 is inside the possible shore arrival space SP1, the controller 41 corrects the target position Tp so that the target position becomes the center position of the possible shore arrival space SP1.

Figure 11:
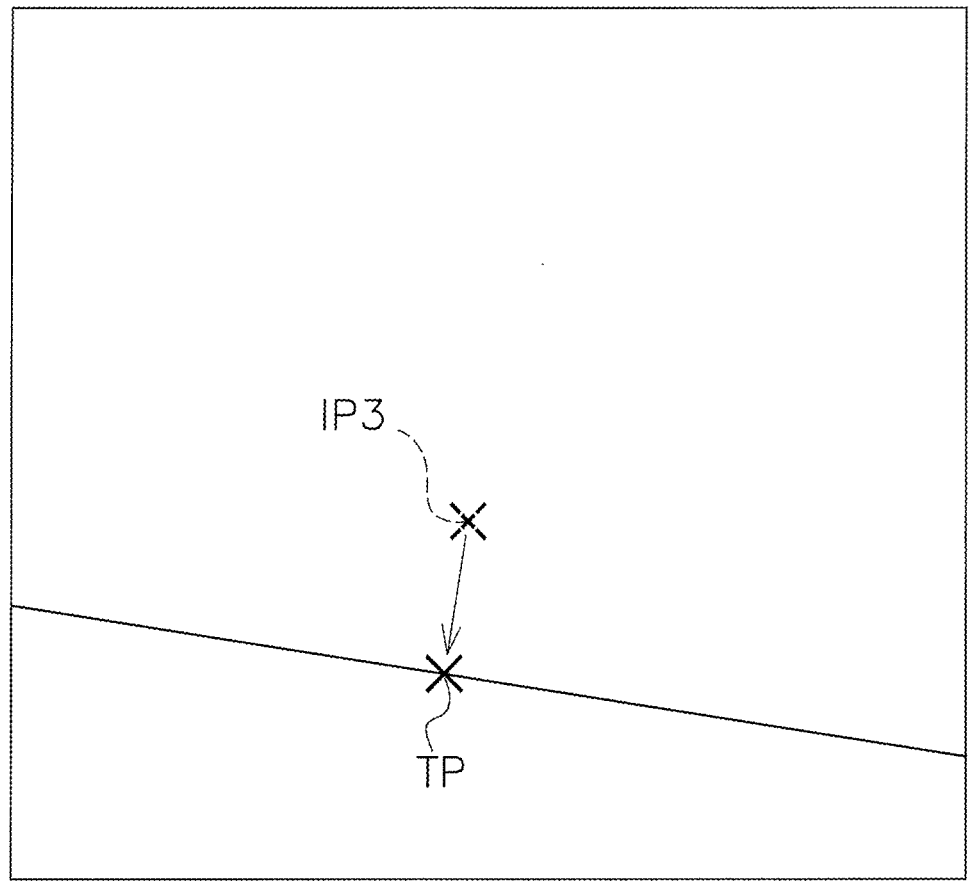
FIG. 11 is a view illustrating an input and correction method of a target position for shore arrival.

As illustrated in FIG. 9, the operation screen 61 includes a target position setting key 64. When the target position setting key 64 is pressed, the boat operator is able to manually input any position without being limited to the space SP1. Therefore, the touched position is received as the target position by the input 44. In this case, when the position spaced away from the shore arrival location in a direction perpendicular or substantially perpendicular to the direction along the shore arrival location is inputted as the target position, the controller 41 may correct the target position to a position along the shore arrival location. At this time, as illustrated in FIG. 11, the target position Tp is preferably corrected to a position closest to the inputted target position IP3 within the position along the shore arrival location.

When there is no input of the target position in step S203, the processing advances to step S206. For example, when a touch of the environment map 62 has not been detected for a predetermined time period, the processing advances to step S206.

Figure 12:
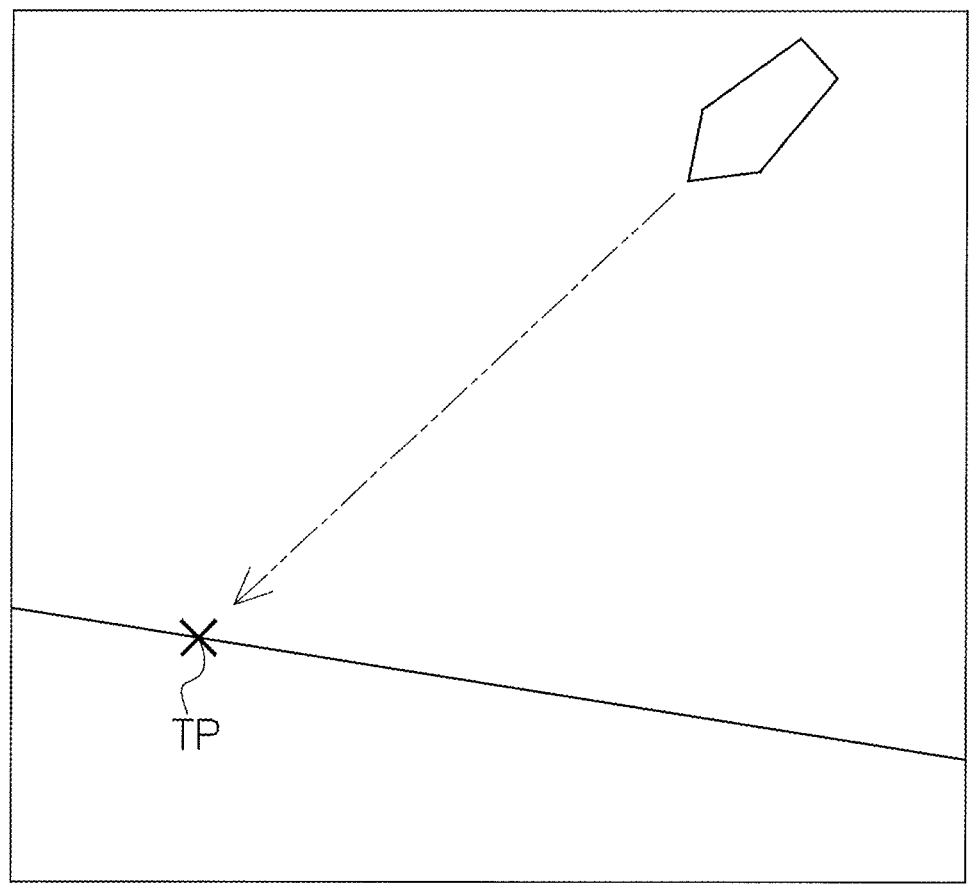
FIG. 12 is a view illustrating an automatic setting method of the target position for shore arrival.

In step S206, the controller 41 automatically sets the target position. Here, as illustrated in FIG. 12, the controller 41 sets the closest position in the current bow direction among the positions along the shore arrival location, as the target position.

In step S207, the controller 41 displays the target position and the target bearing with an icon 71' on the environment map 62. Here, as illustrated in FIG. 9, the controller 41 sets the target position corrected in step S205 or the target position automatically set in step S206 as the target position, and displays the icon 71' which indicates the host boat in the position on the environment map 62. The icon 71' is displayed in the target bearing determined by the controller 41 in the initial state. The controller 41 determines the target bearing of the boat body 2 based on the shape of the shore arrival location, the current bearing, the distance to the target position, or the like. For example, when the shore arrival location is a pier, the controller 41 determines a direction along the edge of the shore arrival location as the target bearing. Alternatively, the controller 41 may determine a direction that defines a predetermined angle with the direction along the edge of the shore arrival location, as the target bearing. Moreover, the controller 41 may change the target bearing in response to the current bearing or the distance to the target position.

As illustrated in FIG. 9, the operation screen 61 includes a first bearing changing key 65 and a second bearing changing key 66. The target bearing is changed by a predetermined angle (for example, about 90° at a time) each time the first bearing changing key 65 is pressed. However, the unit angle for the changing is not limited to 90° and may be smaller than 90° or greater than 90°. The second bearing changing key 66 is rotatably provided on the operation screen 61. The target bearing is changed in response to the rotation of the second bearing changing key 66. The bearing of the icon 71' of the host boat on the environment screen is changed in response to the change of the target bearing.

When the inputted target position is not within a suitable range SP2 in step S204, the target position is not corrected and the inputted target position is set as the target position. For example, as illustrated in FIG. 10, the suitable range SP2 is a range that includes the possible shore arrival space SP1. When the inputted target position IP4 is outside of the suitable range SP2, the target position is not corrected. Therefore, when the inputted target position IP4 is spaced away from the possible shore arrival space SP1 by a predetermined distance or more, the inputted target position is not corrected and is set as the target position. The size of the suitable range SP2 is set to a value that is able to be determined when a position spaced away from the possible shore arrival space SP1 is intentionally touched without the target position input being shifted.

Next, the execution of the automatic shore arrival control by the controller 41 will be discussed with reference to FIGS. 7 and 8.

In step S301, the controller 41 determines whether an automatic shore arrival mode start button 67 illustrated in FIG. 9 has been pressed. If the automatic shore arrival mode start button 67 has not been pressed, the processing returns to the above-described step S203. If the automatic shore arrival mode start button 67 has been pressed, the processing advances to step S302.

In step S302, the controller 41 determines whether all of the starting conditions for an automatic shore arrival mode have been met. As illustrated in FIG. 17, the following conditions are included in the starting conditions for the automatic shore arrival mode. The conditions listed below are AND conditions.

Starting conditions for automatic shore arrival mode
The first throttle operator 15L is positioned in the neutral position.
The second throttle operator 15R is positioned in the neutral position.
The first engine 3L is running.
The second engine 3R is running.
The rotation speed of the first engine 3L is equal to or less than a predetermined threshold.
The rotation speed of the second engine 3R is equal to or less than a predetermined threshold.
The speed, acceleration, angular speed, and angular acceleration of the boat body 2 are equal to or less than predetermined thresholds.
No system error is generated due to the detection of an abnormal value or the like in the sensors.
No nearby obstruction has been detected by the sensing device 46.

If any one of the starting conditions for the automatic shore arrival mode is not met in step S302, the processing returns to step S203 after step S303.

In step S303, the controller 41 notifies the boat operator that the starting conditions for the automatic shore arrival mode have not been met. For example, the controller 41 is able to emit a notification sound or display the starting condition that has not been met on the operation screen 61.

In this way, when the starting conditions for the automatic shore arrival mode have not been met, the automatic shore arrival control is not started and is temporarily ended and therefore is able to be put on standby until a state suited to the automatic shore arrival control is achieved. In particular, because the positioning of the first and second throttle operators 15L and 15R in the neutral position is included in the starting conditions and the execution of the automatic shore arrival control is put on standby when the boat operator intentionally moves the boat body 2, the intentions of the boat operator are reflected in the automatic shore arrival control.

The positioning of the steering device 14 in the neutral position is not included as a condition in the starting conditions for the automatic shore arrival mode. As a result, the controller 41 starts the execution of the automatic shore arrival control so long as the starting conditions of the automatic shore arrival mode are met even if the steering device 14 is positioned in the right turn position or the left turn position.

When all of the starting conditions for the automatic shore arrival mode are met in step S302, the processing advances to step S304. In step S304, the controller 41 generates instruction signals to control the propulsion devices 4L and 4R so that the boat body 2 arrives at the target position.

In step S305, the controller 41 evaluates whether the boat 1 has reached a second target position.

Figure 13:
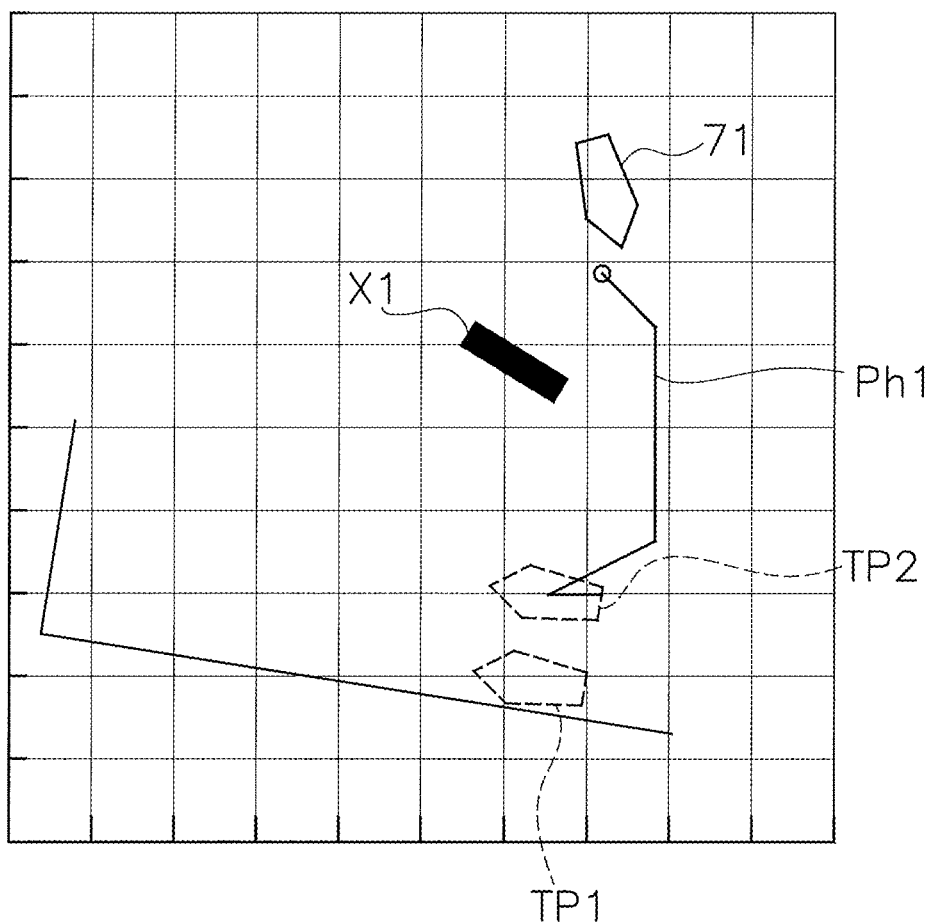
FIG. 13 is a view illustrating an example of an environment map.

As illustrated in FIG. 13, with the target position and the target bearing determined in above-described steps S201 to S208 being established as the first target position TP1, the second target position TP2 is a position spaced away from a first target position TP1 by a predetermined offset amount on the current position side of the boat 1. In the automatic shore arrival control, the controller 41 firstly controls the propulsion devices 4L and 4R so that the boat 1 reaches the second target position TP2, and then controls the propulsion devices 4L and 4R so that the boat 1 reaches the first target position TP1. The second target position TP2 is explained below.

When the boat 1 has not reached the second target position TP2 in step S305, the processing advances to step S306. In step S306, the controller 41 evaluates whether a position error and a bearing error are equal to or less than first thresholds. The position error is the distance between the current position of the boat body 2 and the second target position TP2. The bearing error is the difference between the current bearing of the boat body 2 and the target bearing. When the distance between the current position of the boat body 2 and the second target position TP2 is equal to or less than a first position threshold, and the difference between the current bearing of the boat body 2 and the target bearing is less than a first bearing threshold, the controller 41 determines that the position error and the bearing error are equal to or less than the first thresholds. When the position error and the bearing error are not equal to or less than the first thresholds, the processing advances to step S307.

Figure 14:
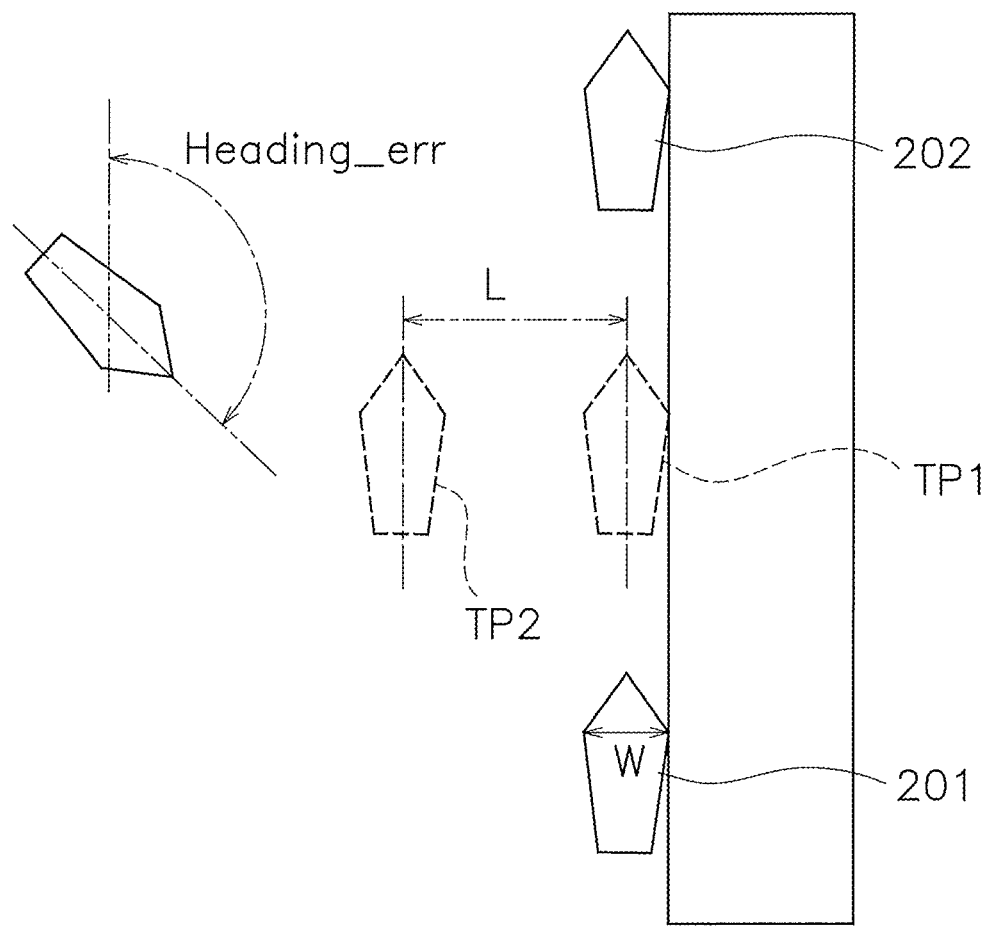
FIG. 14 is a view illustrating a determination method for an offset amount.

In step S307, the controller 41 determines the second target position TP2. As illustrated in FIG. 14, the controller 41 calculates the bearing difference between the current bearing and the target bearing, and determines an offset amount L of the first target position TP1 in response to the bearing difference. The controller 41 determines a position spaced away by the offset amount from the first target position TP1 on the current position side as the second target position TP2. That is, the controller 41 determines a position spaced away by the offset amount L from the first target position TP1 in the direction perpendicular or substantially perpendicular to the edge of the shore arrival location, as the second target position TP2. Specifically, when the shore arrival location is a pier, the controller 41 uses the following equation 1 to determine the offset amount.

$$L = a \times |\text{Heading\_err}/90| + b + W \qquad \text{Equation 1}$$

L is the offset amount. a is a predetermined coefficient and is determined based on the distance between the center of gravity and the bow of the boat body 2. The Heading_err is the bearing difference between the current bearing and the first target bearing as illustrated in FIG. 14. However when the Heading_err is equal to or greater than 90°, the Heading_err is set to 90°. b is a margin corresponding to the boat body 2 with respect to the target bearing and the direction along the edge of the shore arrival location. W is the width of another boat.

That is, the controller 41 calculates the bearing difference between the current bearing and the target bearing and calculates the margin that corresponds to the boat body 2. The controller 41 determines the offset amount L of the first target position TP1 in response to the bearing difference and the margin that corresponds to the boat body 2.

Therefore, the controller 41 increases the offset amount in response to the size of the bearing difference Heading_err. The controller 41 determines the offset amount based on the distance between the center of gravity and the bow of the boat body 2. The controller 41 determines the offset amount so as to be greater than the width W of another boat docked at the shore arrival location. The offset amount is calculated and updated in real time.

Figure 15:
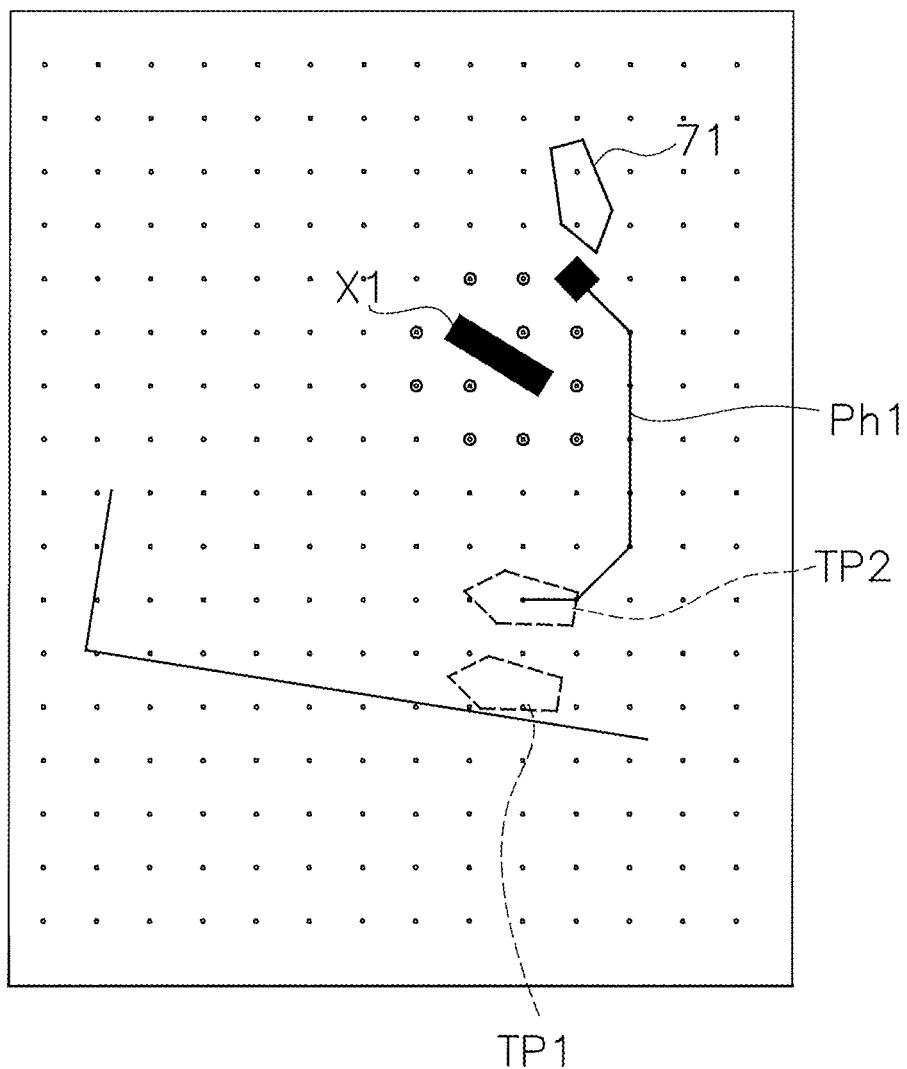
FIG. 15 is a view illustrating a determination method for a target navigation route.

As illustrated in FIG. 13, when an obstruction X1 is present between the first target position TP1 and the current position, the controller 41 determines the second target position TP2 so as to avoid the obstruction. Specifically, as illustrated in FIG. 15, a grid is provided on the environment map 62. The controller 41 determines the second target position TP2 by excluding the grid within a predetermined range from the obstruction X1.

In addition, the controller 41 determines a target navigation route Ph1 to the second target position TP2. The controller 41 establishes the shortest route to the second target position TP2 within the route that passes through the set grid, as the target navigation route Ph1. At this time, when an obstruction is present, the controller 41 determines the target navigation route Ph1 by excluding the grid within the predetermined range from the object recognized as the obstruction. The determined target navigation route Ph1 is displayed on the environment map 62. The controller 41 calculates and updates the target navigation route Ph1 in real time.

The disposition of the grid is set so that a predetermined number of grids are disposed between the current position of the boat body 2 and the target position. Therefore, when the distance between the boat body 2 and the target position is changed, the disposition of the grid is changed.

Figure 7:
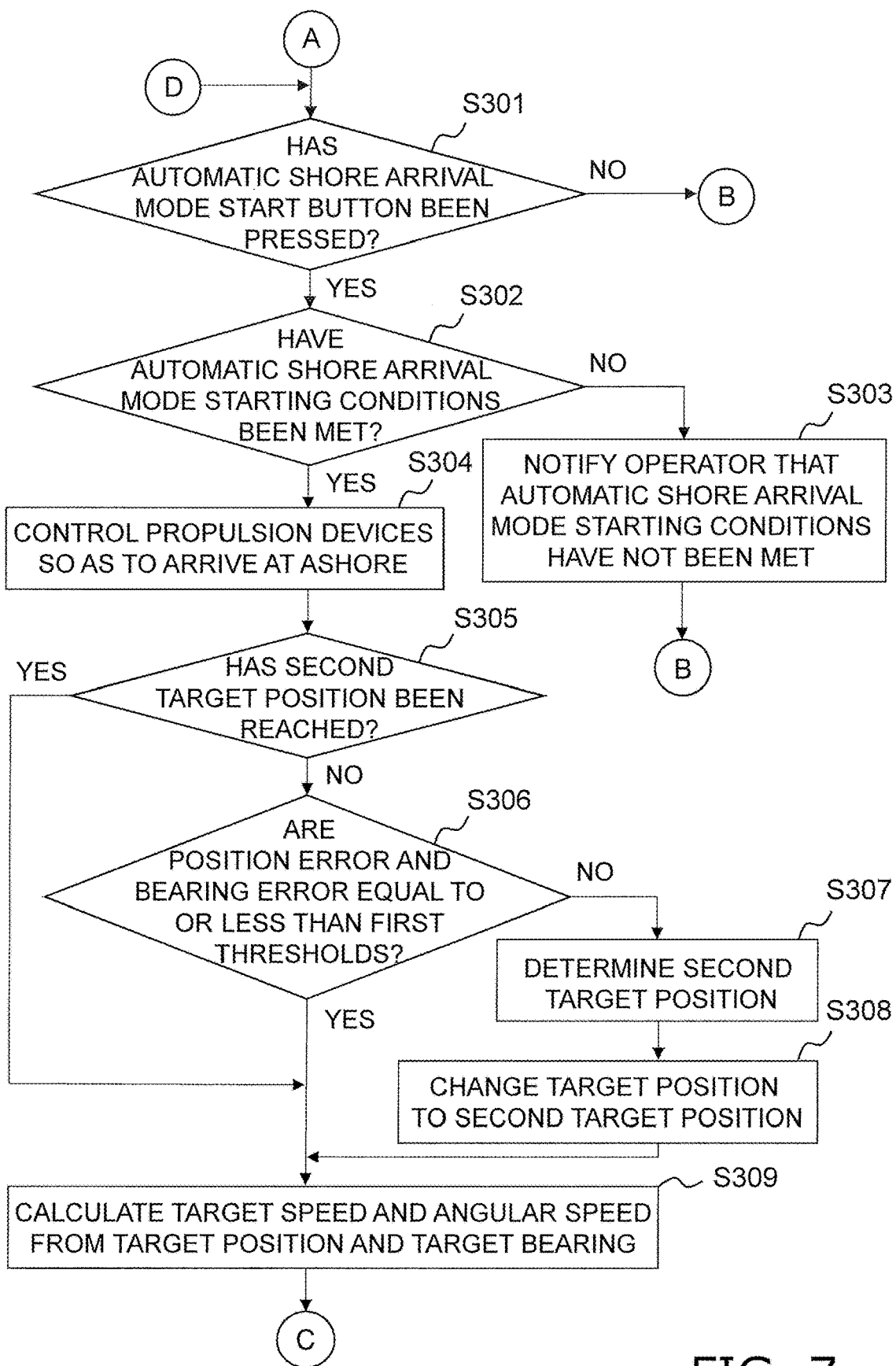
FIG. 7 is a flow chart illustrating automatic shore arrival control processing.

As shown in step S308 in FIG. 7, the controller 41 changes the target position from the first target position TP1 to the second target position TP2.

When the position error and the bearing error are equal to or less than the first thresholds in step S306, the processing advances to step S309. That is, the processing advances to step S309 when the current position is near the second target position TP2 and the current bearing is near the target bearing without the boat 1 having completely reached the second target position TP2.

In step S309, the controller 41 determines a target speed and a target angular speed from the target position and the target bearing.

When the boat 1 has not yet entered a predetermined range from the second target position TP2 ("No" in S305), the controller 41 sets the second target position TP2 as the target position and determines the target speed and the target angular speed. When the boat 1 has entered the predetermined range from the second target position TP2 ("Yes" in S305 or S306), the controller 41 sets the first target position TP1 as the target position and determines the target speed and angular speed.

Figure 16:
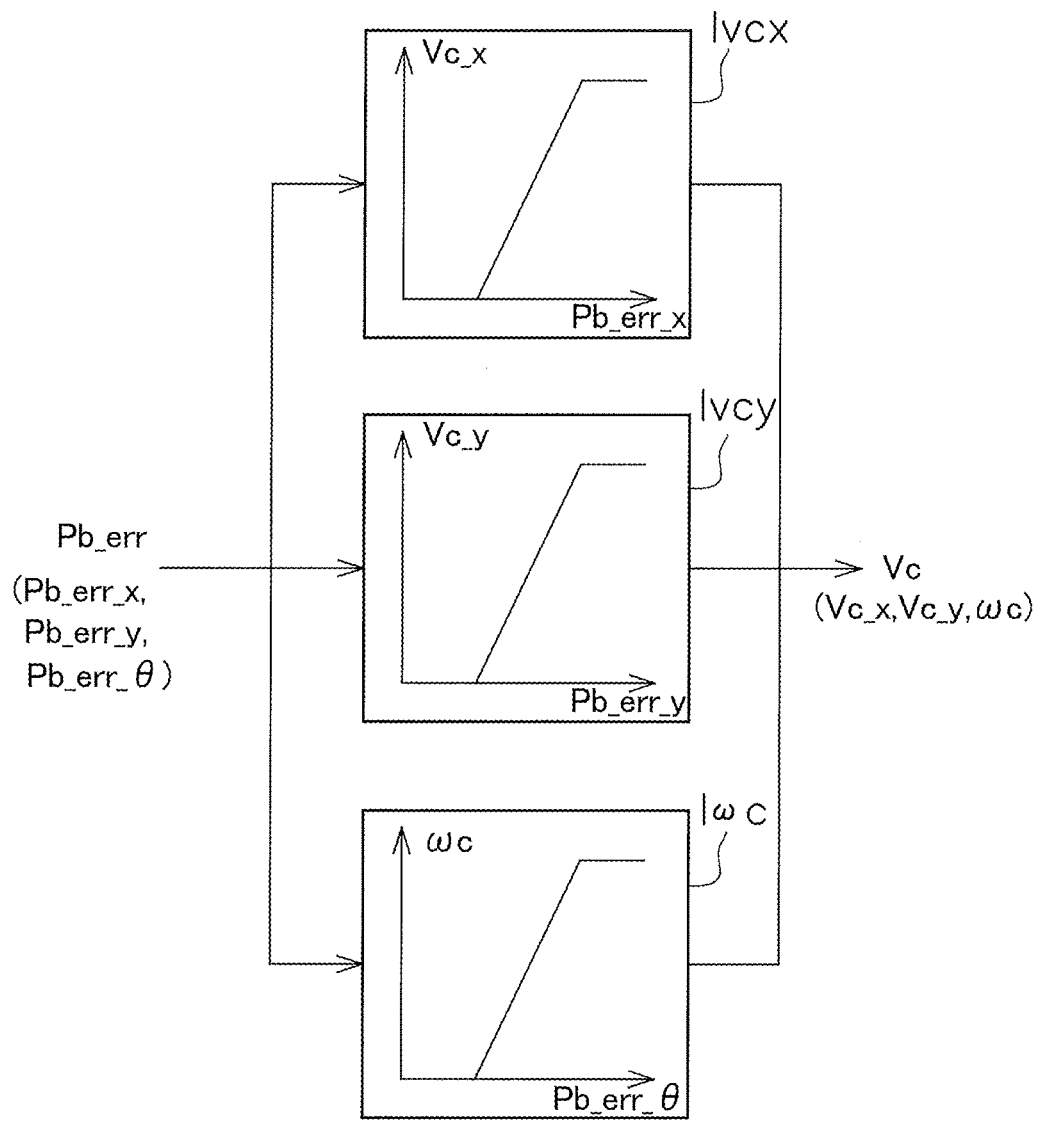
FIG. 16 is a view illustrating a control block for determining a target velocity and angular speed.

As illustrated in FIG. 16, the controller 41 calculates a relative error Pb_err from the target position and the current position and from the target bearing and the current bearing, and determines a target speed and angular speed Vc based on the relative error Pb_err. The controller 41 reduces the target speed and angular speed Vc in response to a reduction in the relative error Pb_err. That is, the controller 41 reduces the target speed as the current position of the boat body 2 approaches the target position. The controller 41 reduces the target angular speed as the current bearing of the boat body 2 approaches the target bearing. When the distance between the current position of the boat body 2 and the target position enters a predetermined range that includes zero, the controller 41 sets the target speed to zero. Moreover, when the difference between the current position of the boat body 2 and the target position enters the predetermined range that includes zero, the controller 41 sets the target angular speed to zero.

The relative error Pb_err includes a first position error Pb_err_x, a second position error Pb_err_y, and a bearing error Pb_err_θ. The first position error Pb_err_x is the distance between the target position and the current position in the front-back direction of the boat body 2. The second position error Pb_err_y is the distance between the target position and the current position in the left-right direction of the boat body 2. The bearing error Pb_err_θ is the difference between the target bearing and the current bearing.

The target speed and angular speed Vc includes a first target speed Vc_x, a second target speed Vc_y, and a target angular speed ωc. The first target speed Vc_x is the target speed in the front-back direction of the boat body 2. The second target speed Vc_y is the target speed in the left-right direction of the boat body 2. The target angular speed ωc is the target angular speed of the boat body 2.

The controller 41 stores first target speed information Ivcx, second target speed information Ivcy, and target angular speed information Iωc. The first target speed information Ivcx defines the relationship between the first position error Pb_err_x and the first target speed Vc_x. The second target speed information Ivcy defines the relationship between the second position error Pb_err_y and the second target speed Vc_y. The target angular speed information Iωc defines the relationship between the bearing error Pb_err_θ and the target angular speed ωc. The above sets of information Ivcx to Iωc may be represented, for example, by maps, tables, numerical calculations, or equations, etc.

The controller 41 determines the first target speed Vc_x from the first position error Pb_err_x based on the first target speed information Ivcx. The controller 41 determines the second target speed Vc_y from the second position error Pb_err_y based on the second target speed information Ivcy. The controller 41 determines the target angular speed ωc based on the target angular speed information Iωc.

Alternatively, the target speed and angular speed Vc may be determined with the following equation 2. Any of the first position error Pb_err_x, the second position error Pb_err_y, the bearing error Pb_err_θ, the actual speed Vx in the front-back direction of the boat body 2, the actual speed Vy in the left-right direction, and the actual angular speed ω may be used as inputs.

$$Vc = \begin{pmatrix} Vc\_x \\ Vc\_y \\ \omega c \end{pmatrix} = f(Pb\_err\_x, Pb\_err\_y, Pb\_err\_\theta, Vx, Vy, \omega) \quad \text{Equation 2}$$

Figure 8:
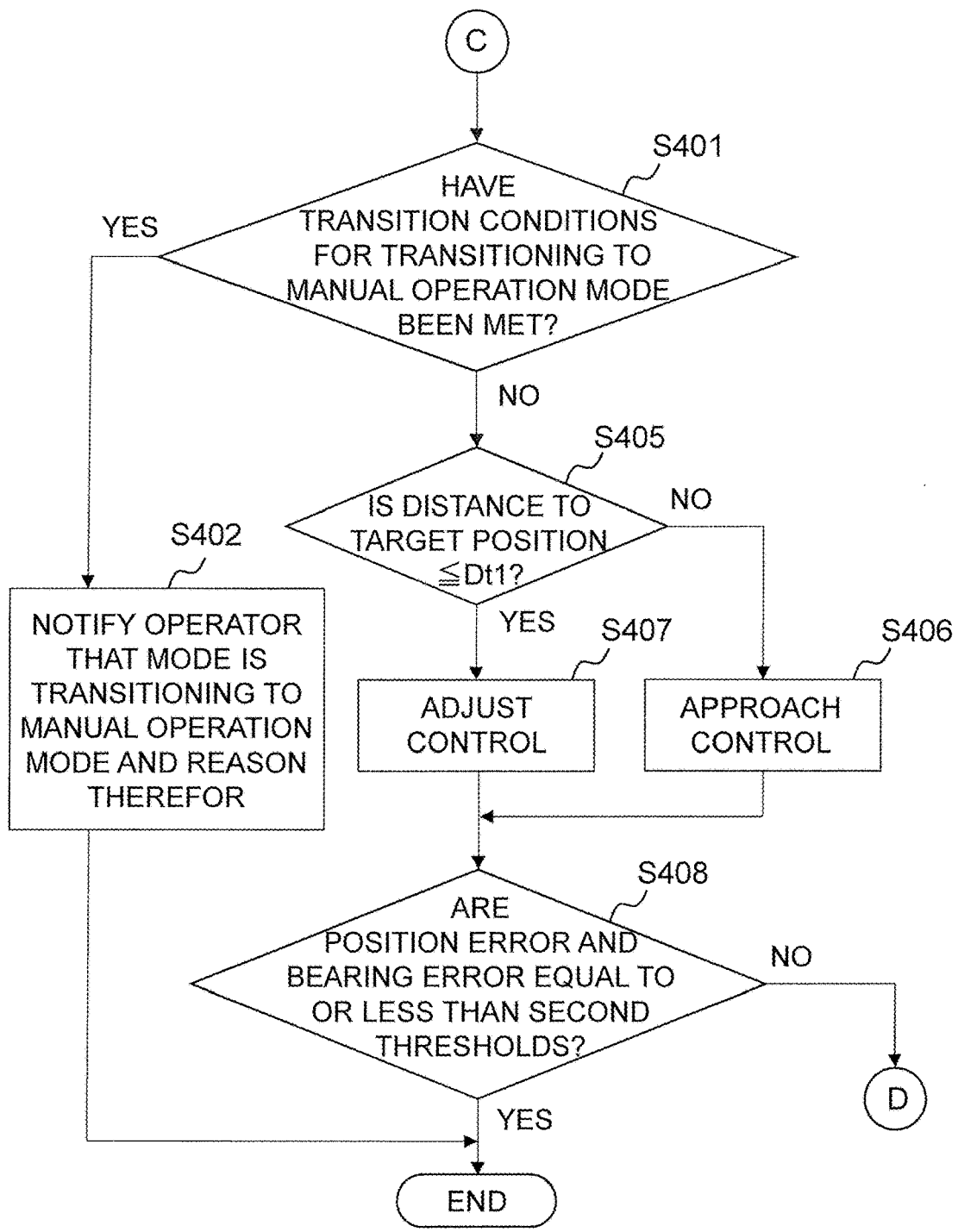
FIG. 8 is a flow chart illustrating automatic shore arrival control processing.

As illustrated in in step S401 in FIG. 8, the controller 41 evaluates whether any one of transition conditions for transitioning to a manual operation mode has been met. As illustrated in FIG. 18, the following conditions are listed in the transition conditions for transitioning to a manual operation mode. The following conditions are OR conditions.

Transitioning conditions for transitioning to the manual operation mode
- A manual operation mode transition button 70 (see FIG. 9) has been pressed.
- The first throttle operator 15L is positioned in a non-neutral position.
- The second throttle operator 15R is positioned in a non-neutral position.
- The automatic shore arrival mode stop button 68 (see FIG. 9) has been pressed.
- No system error is generated due to the detection of an abnormal value or the like in the sensors.
- No nearby obstruction has been detected by the sensing device 46.
- The boat 1 has moved out of a predetermined area (for example, the environment map 62 in FIG. 9).

When at least one of the transition conditions for transitioning to the manual operation mode has been met in step S401, the processing advances to step S402. In step S402, the controller 41 notifies the boat operator that the mode is transitioning to the manual operation mode because a transition condition has been met. For example, the controller 41 displays "Transitioning to the manual operation mode" and the "Satisfied transition condition" on the operation screen 61.

After step S402, the automatic shore arrival control is ended. As a result, the control of the controller 41 transitions from the automatic shore arrival mode to the manual operation mode. In the manual operation mode, the controller 41 executes the control in accordance with an operation of the steering device 14 and the remote control unit 15, or of the joystick 42.

In this way, the automatic shore arrival control is ended when a transition condition for transitioning to the manual operation mode has been met during the execution of the automatic shore arrival control. In particular, because the positioning of the first and second throttle operators 15L and 15R in a non-neutral position is included as a condition and the execution of the automatic shore arrival control is promptly ended when the boat operator intentionally moves the boat body, the intentions of the boat operator are reflected in the automatic shore arrival control.

The positioning of the steering device 14 in the neutral position is not included as a condition in the transition conditions for transitioning to the manual operation mode. As a result, the mode is not switched to the manual operation mode so long as no transition condition for transitioning to the manual operation mode is met even if the steering device 14 is positioned in the right turn position or the left turn position.

When none of the transition conditions for transitioning to the manual operation mode have been met in step S401, the processing advances to step S405.

As shown in step S405, the controller 41 evaluates whether the distance from the current position to the target position is equal to or less than a predetermined threshold Dt1. When the distance to the target position is not equal to or less than the predetermined threshold Dt1, the processing advances to step S406. In step S406, the boat body 2 is controlled using an approach control. In the approach control, the controller 41 determines a target propulsion force and a target steering angle of the propulsion devices 4L and 4R based on the first target speed Vc_x and the target angular speed ωc.

When the distance from the current position to the target position is equal to or less than the predetermined threshold Dt1 in step S405, the processing advances to step S407. In step S407, the boat body 2 is controlled using an adjust control. In the adjust control, the target propulsion force and the target steering angle of the propulsion devices 4L and 4R are determined based on the first target speed Vc_x, the second target speed Vc_y, and the target angular speed ωc.

In this way, when the distance to the target position is greater than the predetermined threshold Dt1, the target position and the target bearing are reached promptly under the approach control. When the distance to the target position is equal to or less than the predetermined threshold Dt1, the boat body 2 is able to be brought to the target position with high accuracy under the adjust control.

Figure 19:
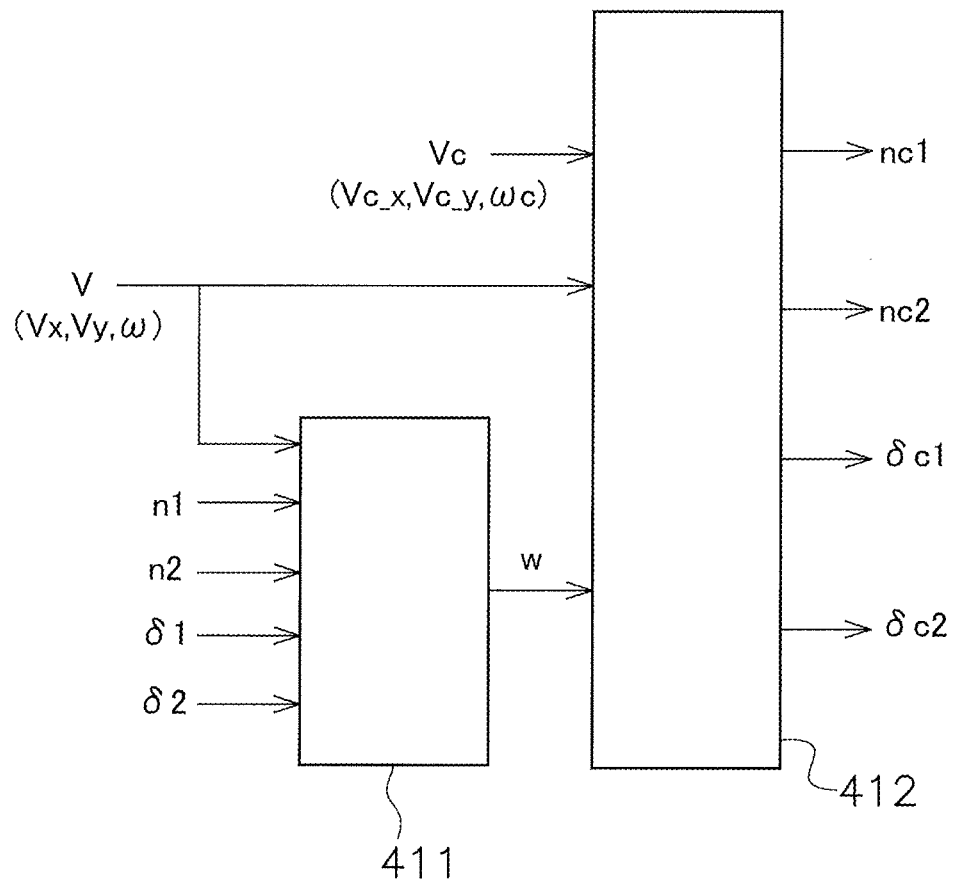
FIG. 19 is a view illustrating a control block for determining a target propulsion force and steering angle.

In step S406 and step S407, the controller 41 calculates a force caused by an outside disturbance and determines the target propulsion force and the target steering angle of the propulsion devices 4L and 4R in consideration of the force of the outside disturbance. The outside disturbance includes, for example, the tidal current or the wind. Fluctuations in the resistance to the boat body caused by weight fluctuations and the like are included in the calculated results. Specifically, the controller 41 determines the target propulsion force and the target steering angle based on the force of the outside disturbance, the target speed, and the target angular speed. FIG. 19 is a control block diagram for determining the target propulsion force and the target steering angle.

As illustrated in FIG. 19, the controller 41 includes an outside disturbance observer 411 and a target propulsion force and steering angle computing unit 412. The outside disturbance observer 411 calculates an outside disturbance force w based on the actual speed and angular speed V of the boat body 2, the actual engine rotation speed n1 of the first engine 3L, the actual engine rotation speed n2 of the second engine 3R, the actual steering angle δ1 of the first propulsion device 4L, and the actual steering angle δ2 of the second propulsion device 4R. The actual speed and angular speed V of the boat body 2 includes the actual speed Vx in the front-back direction of the boat body 2, the actual speed Vy in the left-right direction, and the actual angular speed ω.

The target propulsion force and steering angle computing unit 412 calculates a target propulsion force based on the target speed and angular speed Vc, the actual speed and angular speed V of the boat body 2, and the outside disturbance force w. The controller 41 estimates the outside disturbance force w using the following equation 3.

$$\dot{\hat{V}} = f_{model}(Vx, Vy, \omega, n1, n2, \delta1, \delta2)$$

$$w = \dot{V} - \dot{\hat{V}} \quad \text{Equation 3}$$

$f_{model}$ is a motion equation of the boat body 2. $\dot{V}$ is the time derivative of V. $\dot{\hat{V}}$ is an estimation using the motion equation of the boat body 2.

The controller 41 uses the motion equation represented in the following equation 4 to calculate a target propulsion force based on, for example, the Lyapunov theory of stability.

$$\dot{V} = f_{model}(Vx, Vy, \omega, n1, n2, \delta1, \delta2) + w \quad \text{Equation 4}$$

The target propulsion force and steering angle computing unit 412 determines a target rotation speed nc1 of the first engine 3L and the target rotation speed nc2 of the second engine 3R from the target propulsion force. The controller 41 generates an instruction signal corresponding to the target rotation speed nc1 of the first engine 3L and outputs the instruction signal to the first ECU 31L. The controller 41 generates an instruction signal corresponding to the target rotation speed nc2 of the second engine 3R and outputs the instruction signal to the second ECU 31R.

Moreover, the target propulsion force and steering angle computing unit 412 determines a target steering angle δc1 of the first propulsion device 4L and a target steering angle δc2 of the second propulsion device 4R based on the target speed and angular speed Vc, the actual speed and angular speed V of the boat body 2, and the outside disturbance force w. The controller 41 generates an instruction signal corresponding to the target steering angle δc1 of the first propulsion device 4L and outputs the instruction signal to the first steering CU 33L. The controller 41 generates an instruction signal corresponding to the target steering angle δc2 of the second propulsion device 4R and outputs the instruction signal to the second steering CU 33R.

As illustrated in step S408 in FIG. 8, the controller 41 evaluates whether the position error and the bearing error are equal to or less than second thresholds. Specifically, when the distance between the current position of the boat body 2 and the target position is equal to or less than a second position threshold, and the difference between the current bearing of the boat body 2 and the target bearing is equal to or less than a second bearing threshold, the controller 41 determines that the position error and the bearing error are equal to or less than the second thresholds. The second position threshold is set to a value less than the above-described offset amount. When the position error and the bearing error are equal to or less than the second thresholds, the controller 41 ends the automatic shore arrival control.

Although preferred embodiments of the present invention have been described so far, the present invention is not limited to the above preferred embodiments and various modifications may be made within the scope of the invention.

The boat 1 is not limited to a jet propulsion boat and may be another type of boat. For example, the boat 1 may be a boat provided with outboard motors that include propellers driven by the engines 3L and 3R. That is, the propulsion devices 4L and 4R are not limited to jet propulsion devices and may be another type of propulsion device such as an outboard motor.

The automatic shore arrival control may be executed in a predetermined low-speed region. For example, the automatic shore arrival control may be executed when the boat speed is a predetermined set speed or less.

The correction method for the target position of the shore arrival may be changed. Alternatively, the correction of the target position may be omitted. The method for determining the second target position may be changed. That is, the method for determining the offset amount may be changed.

Alternatively, the setting of the second target position may be omitted. The method for estimating the outside disturbance may be changed. Alternatively, the estimation of the outside disturbance may be omitted.

The condition (AND condition) "The steering device 14 is positioned in a predetermined range that includes the neutral position" may be included in the starting conditions for the automatic shore arrival mode. That is, the controller 41 may not start the automatic shore arrival control and may be put on standby until the steering device 14 returns to the predetermined range when the steering device 14 is operated beyond the predetermined range.

The condition (OR condition) "The steering device 14 is positioned in a predetermined range that includes the neutral position" may be included in the transition conditions for transitioning to the manual operation mode. That is, the controller 41 end the automatic shore arrival control during execution when the steering device 14 is operated beyond the predetermined range.

In the above preferred embodiments, the controller 41 sets the position inputted with the input 44 by the boat operator as the target position. However, the controller 41 may set another position as the target position. For example, the controller 41 may determine the current position of the trailer 100 as the target position. Hereinbelow, an automatic shore arrival control when the target position is the current position of the trailer 100 is referred to as a "trailer mode." For example, a settings screen may be evoked by the menu key 69 illustrated in FIG. 9, and the trailer mode may be selected with the settings screen. Alternatively, the selection may be performed automatically by the controller 41.

As illustrated in FIG. 20, in the trailer mode, the controller 41 may receive the trailer position information from the transmitter 101 mounted on the trailer 100 and may set the current position of the trailer 100 obtained from the trailer position information as a first target position. The controller 41 sets the direction in line with the orientation of the trailer 100 as the target bearing. In this case, under the automatic shore arrival control, the boat 1 is able to automatically arrive at the loading position for loading onto the trailer 100. Consequently, the work to load the boat 1 onto the trailer 100 is facilitated.

In the trailer mode, an offset amount may be determined with the following equation 5.

$$L = ax \times |Heading\_err/30| + bx$$

$$L = ay \times |Heading\_err/30| + by \qquad \text{Equation 5}$$

Lx is the offset amount in the front-back direction of the boat body 2. That is, Lx is a first offset amount in the direction in line with the orientation of the trailer 100. Ly is an offset amount in the left-right direction of the boat body 2. That is, Ly is a second offset amount in a direction perpendicular to the direction in line with the orientation of the trailer 100.

ax and ay are predetermined coefficients and are determined based on the distance between the center of gravity and the bow of the boat body 2. The Heading_err is the difference between a difference ψ between the direction from the current position toward the second target position TP2 and the target bearing, and a difference θ between the current bearing and the target bearing. However when the Heading_err is equal to or greater than 30°, the Heading_err is set to 30°. When the Heading_err is equal to or less than 3°, the Heading_err is set to 0°. The Heading_err may be a parameter determined in response to the size of an outside disturbance. The controller 41 may increase the Heading_err in response to an increase in the outside disturbance. bx and by are both margins in accordance with the boat body 2.

The controller 41 determines a position spaced away from the current position of the trailer 100 by the first offset amount Lx in the direction in line with the orientation of the trailer 100, and spaced away from the current position of the trailer 100 by the second offset amount Ly in the direction perpendicular or substantially perpendicular to the direction in line with the orientation of the trailer 100.

The offset amount Ly in the left-right direction of the boat body 2 may be omitted. The offset amount Ly in the left-right direction of the boat body 2 may be applied to a boat in which the propulsion force in the left-right direction is weak such as, for example, a boat including only one propulsion device mounted therein.

The variables in the motion equation of the boat body 2 may be changed or other variables may be added. For example, while the state variables of the motion equation of the boat body 2 in the above preferred embodiments are the actual speed Vx in the front-back direction, the actual speed Vy in the left-right direction, and the actual angular speed ω of the boat body 2, the variables may be changed or other variables may be added. For example, the state variables may be variables indicating the position and attitude of the boat body 2 such as the position in the front-back direction, the position in the left-right direction, the bearing, the pitch angle, or the roll angle of the boat body 2. While the variables of the motion equation in the above preferred embodiments are the actual engine rotation speeds n1 and n2, and the actual steering angles δ1 and δ2, the variables may be increased or reduced in response to the number of propulsion devices.

According to preferred embodiments of the present invention, the boat is able to arrive at the shore easily even in an unspecified harbor. Alternatively, according to preferred embodiments of the present invention, the work of loading the boat onto a trailer is facilitated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat comprising:
   a boat body;
   a propulsion device disposed in the boat body and that generates a propulsion force to move the boat body;
   an operator that operates the propulsion device; and
   a controller configured or programmed to execute an automatic shore arrival control to control the propulsion device so as to move the boat body toward a target position; wherein
   the controller is configured or programmed to end the automatic shore arrival control when the operator is positioned in a non-neutral position that differs from a neutral position;
   the non-neutral position is a forward movement position that causes the propulsion device to generate a propulsion force that causes the boat body to move forward, or a reverse movement position that causes the propulsion device to generate a propulsion force that causes the boat body to move in reverse;

the controller is configured or programmed to start the automatic shore arrival control when the operator is positioned in the neutral position; and the forward movement position corresponds to when a bucket of the propulsion device is positioned in a forward movement position, and the reverse movement position corresponds to when the bucket of the propulsion device is positioned in a reverse movement position.

2. The boat according to claim 1, wherein the controller is configured or programmed to end the automatic shore arrival control when the operator is positioned in the non-neutral position during the execution of the automatic shore arrival control.

3. The boat according to claim 1, wherein the operator outputs, to the controller, a throttle operation signal which indicates generation of the propulsion force when the operator is positioned in the non-neutral position.

4. The boat according to claim 1, further comprising:
a steering device that steers the boat body; wherein
the controller is configured or programmed to continue the automatic shore arrival control even when the steering device is operated within a predetermined range including the neutral position during the execution of the automatic shore arrival control.

5. The boat according to claim 1, further comprising:
a sensor that detects a shape of a shore arrival location and a positional relationship between the shore arrival location and the boat body, and outputs environment information which indicates the shape of the shore arrival location and the positional relationship; wherein
the controller is configured or programmed to receive the environment information and to determine the shore arrival location as the target position based on the environment information.

6. The boat according to claim 1, further comprising:
a receiver that receives trailer position information that is transmitted from a trailer and indicates a current position of the trailer, or a sensor that detects the current position of the trailer and obtains the trailer position information; wherein
the controller is configured or programmed to determine the current position of the trailer as the target position.

7. A boat comprising:
a boat body;
a propulsion device disposed in the boat body and that generates a propulsion force to move the boat body;
an operator that operates the propulsion device;
a sensing device that detects a distance between an object and the boat body; and
a controller configured or programmed to execute an automatic shore arrival control to control the propulsion device so as to move the boat body toward a target position; wherein
the controller is configured or programmed to end the automatic shore arrival control and transition from an automatic shore arrival mode to a manual operation mode when the operator is positioned in a non-neutral position that differs from a neutral position and when the object is detected by the sensing device.

8. A boat comprising:
a boat body;
a propulsion device disposed in the boat body and that generates a propulsion force to move the boat body;
an operator that operates the propulsion device;
a positional sensor that detects a current position of the boat body; and
a controller configured or programmed to execute an automatic shore arrival control to control the propulsion device so as to move the boat body toward a target position; wherein
the controller is configured or programmed to end the automatic shore arrival control when the operator is positioned in a non-neutral position that differs from a neutral position and when the current position of the boat body has moved out of a predetermined area; and
the target position is within the predetermined area.

* * * * *